United States Patent
Kweon et al.

(10) Patent No.: US 6,765,716 B2
(45) Date of Patent: Jul. 20, 2004

(54) LOW NOISE OPTICAL AMPLIFIER AND OPTICAL COMMUNICATION SYSTEM USING THE SAME

(75) Inventors: Gyeong-Il Kweon, Gunpo (KR); Jung-Ho Choi, Incheon (KR); Chang-Ho Lee, Seoul (KR)

(73) Assignee: LG Cable Ltd., Seoul (KR)

( * ) Notice: Subject to any disclaimer, the term of this patent is extended or adjusted under 35 U.S.C. 154(b) by 73 days.

(21) Appl. No.: 10/231,266

(22) Filed: Aug. 30, 2002

(65) Prior Publication Data

US 2003/0053201 A1 Mar. 20, 2003

(51) Int. Cl.$^7$ .................................................. H01S 3/00
(52) U.S. Cl. ........................................ 359/349; 359/337
(58) Field of Search .......................... 359/337, 337.2, 359/349

(56) References Cited

U.S. PATENT DOCUMENTS

| | | |
|---|---|---|
| 4,809,285 A | 2/1989 | Scully |
| 5,191,390 A | 3/1993 | Diels et al. |
| 5,403,572 A | 4/1995 | Gries et al. |
| 5,636,053 A | 6/1997 | Pan |
| 5,717,797 A * | 2/1998 | Evans .................... 385/27 |
| 6,337,763 B1 * | 1/2002 | Berkey et al. ............ 359/337.2 |
| 6,374,006 B1 * | 4/2002 | Islam et al. .................... 385/15 |
| 6,600,592 B2 * | 7/2003 | Islam .......................... 359/334 |

FOREIGN PATENT DOCUMENTS

| | | |
|---|---|---|
| EP | 0 470 497 | 2/1992 |
| EP | 0 556 973 | 8/1993 |
| EP | 0 647 000 | 4/1995 |

\* cited by examiner

*Primary Examiner*—Mark Hellner
(74) *Attorney, Agent, or Firm*—Staas & Halsey LLP

(57) ABSTRACT

A low noise optical amplifier used in an optical communication system includes optical amplifying elements for amplifying optical signals of a specific wavelength($\lambda$) incident from their ends($F_1,F_2$) and endowing phase difference between ASEs, optical diverging means to interfere the amplified optical signals and the ASEs output from both ends($F_1,F_2$), first path of length($L_1$) to optically connect the one end($F_1$) to first gate($D_1$) of the optical diverging means, and second path of length($L_2$) to optically connect the other end($F_2$) to second gate($D_2$) of the optical diverging means. The first and second paths are designed with distance ($L_1-L_2$) so that the amplified optical signal causes reinforcing interference at the third gate($D_3$) and destructive interference at the fourth gate($D_4$), and the ASE causes destructive interference at the third gate($D_3$) and reinforcing interference at fourth gate($D_4$).

45 Claims, 12 Drawing Sheets

LOW NOISE OPTICAL AMPLIFIER AND OPTICAL COMMUNICATION SYSTEM USING THE SAME

BACKGROUND OF THE INVENTION

1. Field of the Invention

The present invention relates to Low noise optical amplifier (LNOP) and Optical communication system using LNOP, and particularly to Low noise optical amplifier and Optical communication system, which are designed to prevent degradation of the signal-to-noise ratio (SNR) at the receiving station by separating the internally generated amplified spontaneous emission (ASE) from the amplified optical signals.

2. Description of the Related Art

Optical amplifiers are widely used in various fields of optical transmission systems such as CATV distribution network, long-haul transmission between central telephone offices, and undersea inter-terrestrial transmission systems between nations. Also, Semiconductor Optical Amplifiers (SOA), which are superior to the fiber amplifiers in terms of integration and low-price, are key elements in various optical switches and wavelength converters.

In an optical amplifier, the optical signal is amplified without optoelectronic(OE) conversion. Thus, a structure of the optical amplifier is much simpler than that of a conventional regenerator and enables high speed transmission.

Particularly, the development of Erbium Doped Fiber Amplifier (EDFA), which enables direct optical amplification over broad wavelength in the 1550 nm region, lead to great innovation in optical communication technique. In addition, Wavelength Division Multiplexing (WDM) technique using the fact that optical signals with different wavelengths have negligible interaction to each other, enabled enormous expansion in transmission capacity.

FIG. 1 is a simplified diagram showing an EDFA (Erbium Doped Fiber Amplifier).

A conventional Erbium Doped Fiber Amplifier consists of a Pump LD (11), a Wavelength Division Multiplexer (WDM) (13), and a spool of Erbium Doped Fiber (EDF) (14).

The Erbium Doped Fiber (14) is usually made by doping Erbium ions into the core of Single Mode Optical Fiber (SMF) of silica. Erbium ion in silica-host has a meta-stable energy level which is capable of emitting 1.55 $\mu$m wavelength photons by stimulated emission. That is to say, electrons in the said meta-stable energy level have a relatively long excited-state lifetime (~11 msec). When an optical signal in the 1.55 $\mu$m band is simultaneously present during the lifetime of excited electrons, the optical signal causes a stimulated emission of photon and therefore the optical signal is amplified.

As explained above, it is necessary that Erbium electrons stay in meta-stable state for a signal to be amplified by stimulated emission. In order to excite Erbium electron into meta-stable state, WDM (13) and Pump LD (11) are used. Pump LD (11) is designed to produce high optical power in wavelength of 980 nm or 1480 nm. The wavelength of 980 nm or 1480 nm is preferred due to its high efficiency in transferring Erbium electrons into the excited state.

WDM (13) is an element for simultaneously delivering pump light emited from the pump LD (11) and optical signal introduced through the input port (12) to the EDF (14).

Irrespective of signal amplification by stimulated emission, Erbium in the excited state always produces spontaneous emission, and this spontaneously emitted photon itself also produces stimulated emission as it propagates along EDF (14). Therefore, in the output port (15) of an amplifier, there always exist amplified spontaneous emission (ASE) along with amplified signals. Due to the existence of amplified spontaneous emission (ASE), the signal-to-noise ratio (SNR) is degraded at the output port of the amplifier.

FIG. 2 is a schematic diagram illustrating the beat noise between amplified optical signals and ASE spectral components and FIG. 3 is the one illustrating the beat noise between ASE spectral components.

Particularly, the optical spectrum vs. wavelength graph in FIG. 2 shows the formation of beat noise (18) as a result of photoelectric mixing between amplified signals (16) and amplified ASE (17).

Likewise, FIG. 3 shows the formation of beat noise (19) as a result of photoelectric mixing between different ASE spectral components (17), irrespective of the existence of optical signals.

The two kinds of beat noises are similar to the well-known beat phenomena in acoustics. Since the photodetector output current is proportional to the intensity of incident optical signals and not the amplitude thereof (Square-law detector), when two light waves having neighboring frequencies $f_1$ and $f_2$ arrive at a photodetector, the photoelectric current has two signals: one having the sum frequencies of input light $(f_1+f_2)$; the other having differential frequencies $(f_1-f_2)$. Generally, frequency of a light source used for optical communication is on the order of $2\times10^{14}$, which is much greater than the typical electrical bandwidth ($B_e$) of a photodetector. For this reason, the photoelectric signals having the same frequency as the optical signal or the sum of two frequencies $(f_1+f_2)$ are detected only in the average sense at the receiving end. However, since the difference $(f_1-f_2)$ of two frequencies $(f_1, f_2)$ could be less than the bandwidth of a photodetector, there exist signals having the beat frequency $(|f_1-f_2|)$ at the receiving port. Thus, even though the transmitting end intends to send DC signals, there exist oscillating signal components at the receiving end. Furthermore, in case where the light source has a number of frequency components, differential frequency components are produced due to differential combinations of frequencies. When these frequency components exist all together, randomly fluctuating beat noises are generated. If amplified optical signals and ASE exist together as they do at the output port of the amplifier, two types of beat noises are produced at the same time; signal-spontaneous beat noise which occurs between optical signals and ASE having frequency close to that of the optical signals, and spontaneous—spontaneous beat noise which occurs between ASEs.

These beat noises are the dominant noise sources at the receiving end and cause distortion of signals.

Conventionally, a single channel optical amplifier can be evaluated by gain (G), output saturation power and Noise Figure (NF).

Noise Factor (F) is the input signal-to-noise ratio ($SNR_{in}$) divided by output signal-to-noise ratio ($SNR_{out}$), while Noise Figure (NF) is given as 10 times the common logarithm value of Noise Factor (i.e. $NF=10\log_{10}F$). Thus, the fact that noise figure of an optical amplifier can not be lower than 3 dB means that all optical amplifiers degrades the input SNR down to at least half of the original value.

In semi-classical viewpoint, noise figure theories of an optical amplifier can be explained as follows.

First of all, in measuring SNR (signal-to-noise ratio) of optical signals entering through the input port of the optical amplifier, it is assumed that an ideal laser source with a certain wavelength, intensity and bandwidth is directly connected to an ideal detector without any functional or systematical loss.

In this ideal set-up, still there exist two types of noises; thermal noise and laser shot noise. Under the assumption that detector load impedance and temperature are constant, thermal noise is given by a constant irrespective of the intensity of input optical signals. For optical outputs exceeding a certain value, thermal noise becomes negligible compared to laser short noise, and thus can be ignored.

Accordingly, $SNR_{in}$ (input signal-to-noise ratio) is given by the following equation.

$$SNR_{in} = \frac{P_s}{2hvB_e} \quad (1)$$

(hv: photon energy, $P_s$: optical power of input signals, $B_e$: bandwidth of detector)

By the equation, it could be found that signal-to-noise ratio of an input signal entering through the input port of the optical amplifier ($SNR_{in}$) is proportional to the optical power ($P_s$) of the input signal, or more specifically to the input number of photons per unit time ($P_s/hv$).

In measuring signal-to-noise ratio of output signals ($SNR_{out}$), it is assumed that optical source is connected to the input port of an optical amplifier by a lossless jumper cord, and the output of an optical amplifier is similarly connected to an ideal detector without any loss.

Generally, the photodetection current of amplified signals contain thermal noise, shot noises of the amplified signal and ASE, signal-spontaneous beat noise, and spontaneous—spontaneous beat noise.

Since the thermal noise is assumed to be negligible in measurement of $SNR_{in}$, it can also be ignored in determination of $SNR_{out}$ (output SNR). Additionally, compared to the shot noise and the signal-spontaneous beat noise, the spontaneous—spontaneous beat noise can be significantly lowered by placing a narrow optical bandpass filter in front of the detector.

Accordingly, $SNR_{out}$ (output signal-to-noise ratio) is dominated by the shot noise of the amplified signal and the signal-spontaneous beat noise as given by the following equation.

$$SNR_{out} = \frac{(RGP_s)^2}{2qRGP_sB_e + 4R^2GP_s\rho_{ASE}B_e} \quad (2)$$

(q: electron charge, R: detector responsivity, G: gain, $P_s$: optical power of input signals, $B_e$: bandwidth of detector, $\rho_{ASE}$: noise power spectral density in single polarization)

Therefore, the noise factor of an optical amplifier is given by the following equation.

$$F = [SNR_{in}/SNR_{out}] = \frac{2\rho_{ASE}}{Ghv} + \frac{1}{G} \quad (3)$$

Also, since $\rho_{ASE}$ is given by $\rho_{ASE}=n_{sp}hv(G-1)$ for a linear amplifier, Equation 3 is simplified as follows.

$$F = 2n_{sp}\frac{(G-1)}{G} + \frac{1}{G} \quad (4)$$

For large value of gain (G>10), the noise factor is approximately given by $F=2n_{sp}$. Since spontaneous emission factor ($n_{sp}$) is always greater than 1, the minimum noise factor is obtained when $n_{sp}=1$ which corresponds to complete population inversion of the gain medium. The corresponding noise figure is then given as $NF=10\log_{10}F=10\log_{10}2=3.01$ dB.

This is considered as the lowest noise figure that can be achieved. This implies that every time an optical signal is amplified, the signal-to-noise ratio is reduced to the half. Thus, in optical transmission systems where a number of optical amplifiers are used for long-distance communication or power splitting, maximum achievable gain is limited by gain saturation due to accumulated ASE, and signal distortion by signal-spontaneous beat noise limits the total number of optical amplifiers that can be cascaded in series. In case of a semiconductor optical amplifier (SOA), even though it has many advantages over fiber amplifier such as flexible choice of wavelength, high energy efficiency, low production cost, miniaturization and integration, SOA is not in wide spread use in an optical transmission system due to high noise figure.

As explained above, noise figure is considered as one of the most important characteristics of an optical amplifier, and the only characteristics that is limited by fundamental laws of physics. For these reasons, development of techniques related to lowering the optical amplifier noise figure is expected to have an immense influence in both science and industry. Accordingly, there have been many efforts to improve the noise figure of an optical amplifier.

However, conventional optical amplifiers could not eliminate the degradation of signal-to-noise ratio perfectly. The improvement has been only within the limit of conventional theories such as the maximization of population inversion and ASE filtering by narrow band optical filter.

Such conventional optical amplifiers are disclosed in U.S. Pat. Nos. 5,191,390, 4,809,285, 5,636,053 and 5,403,572 and EP laid-open patents 556,973, 470,497, and 647,000.

One of the most common methods is to divide an optical amplifier into two stages and place an optical isolator between the stages so that the optical isolator may prevent lowering population inversion at the input end by the backward propagating ASE. Using a narrow band pass filter in front of the photoreceiver, spontaneous—spontaneous beat noise can be minimized.

Other methods include making a amplifying section into a curved shape to eliminate ASE which has a bigger propagation loss than the signal; making amplifying fiber core into double structure to absorb remnant pump power; using a polarizer to eliminate ASE having polarization perpendicular to that of the optical signal; and lowering temperature of the optical amplifying system to decrease noises.

However, it should be noted that any of these conventional methods is not intended to overcome the theoretical limit of 3 dB. Thus, development of an optical amplifier capable of effectively separating ASE from optical signals is required to significantly improve the SNR at a receiving port.

SUMMARY OF THE INVENTION

The present invention originates from the technical requirement as above, and an object of the present invention is to provide an optical amplifier capable of separating ASE from amplified optical signals.

Particularly, the present invention provides a low-noise optical amplifier with a noise figure less than 3 dB by separating ASE, which is inevitably generated in the course of optical amplification, thus eliminating amplified spontaneous emission shot noise and signal-spontaneous beat noise.

The above and other features and advantages of the present invention and the manner of realizing them will become more apparent, and the invention itself will best be understood from a study of the following description and appended claims with reference to the attached drawings showing some preferred embodiments of the invention. Also, the objects and merits of the present invention are to be realized with the means and the combination of the means in the claims.

In order to achieve the goals described above, a low noise optical amplifier according to the preferred embodiment of the present invention includes an optical amplifying element to amplify optical signals with a predetermined wavelength ($\lambda$) entering through one or both of ends ($F_1$, $F_2$), and impose a fixed phase difference on ASE (amplified spontaneous emission) with the predetermined wavelength ($\lambda$), which is generated within the said amplifying element and emitted through both ends ($F_1$, $F_2$); a beam split means to interfere amplified optical signals and ASE from one end ($F_1$) of the optical amplifying element with those from the other end ($F_2$) of the optical amplifying element, the beam split means having four optical ports ($D_1$, $D_2$, $D_3$, $D_4$), in which a beam entering through either the first port ($D_1$) or the second port ($D_2$) splits into the third port ($D_3$) and the fourth port ($D_4$), and a beam entering through either the third port ($D_3$) or the fourth port ($D_4$) splits into the first port ($D_1$) and the second port ($D_2$); a first path of length ($L_1$) optically connecting one end ($F_1$) of the optical amplifying element to the first port ($D_1$) of the beam split means; and a second path of length ($L_2$) optically connecting the other end ($F_2$) of the optical amplifying element to the second port ($D_2$) of the beam split means.

At this time, the path length difference between the first and second path ($L_1$ and $L_2$) is designed so that the amplified optical signals have constructive interference at the third port ($D_3$) of the beam split means and destructive interference at the fourth port ($D_4$), whereas the internally generated ASE having the same wavelength as the signal has destructive interference at the third port ($D_3$) of the beam split means and constructive interference at the fourth port ($D_4$).

The optical amplifier of the present invention may further include a beam separation means to separate optical signals entering through the third port ($D_3$) of the beam split means, to be amplified, from amplified optical signals discharged through the third port ($D_3$).

Preferably, the beam separation means has at least three ports ($S_1$, $S_2$, $S_3$), in which a portion or all of optical signals entering through one port ($S_1$), which is to be amplified, is discharged through another port ($S_2$), while a portion or all of optical signals entering through another port ($S_2$), which is already amplified, is discharged through the other port ($S_3$).

Additionally, the optical amplifier of the present invention may further include a non-reflection means connected to the fourth port ($D_4$) of the beam split means to prevent the ASE from being reflected toward the beam split means.

The beam separation means can be provided on the first or second path ($L_1$, $L_2$). In this case, the beam split means is preferably designed to have a beam splitting ratio to make the intensity of ASE, which enters through the first port ($D_1$) and gets discharged through the third port ($D_3$) of the beam split means, equal to the intensity of ASE, which enters through the second port ($D_2$) and gets discharged through the third port ($D_3$) of the beam split means.

The optical amplifier of the present invention may further include a beam attenuation means located on the first or second path ($L_1$, $L_2$) to attenuate optical signals and ASE so that the intensity of ASE, which enters through the first port ($D_1$) and gets discharged through the third port ($D_3$) of the beam split means, is equal to the intensity of ASE, which enters through the second port ($D_2$) and gets discharged through the third port ($D_3$) of the beam split means.

At this time, the optical amplifying element should be selected so that ASEs with a specific wavelength have a fixed phase difference, not changing by time, at both ends ($F_1$, $F_2$) of the optical amplifying element, and more preferably have same phase. However, the ASEs need not surely have the same phase. If the phase difference between ASEs is constant, the object intended by the present invention can be obtained by adjusting the length difference between the optical paths suitable for the phase difference.

As an example of the optical amplifying element having the above-described characteristics, a DFB (Distributed Feedback) optical amplifying element can be adopted. This optical amplifying element has a grating structure in which first medium having an effective refractive index ($n_1$) with thickness ($t_1$) and second medium having an effective refractive index ($n_2$) with thickness ($t_2$) alternate regularly along the direction of beam propagation, wherein the grating period approximately satisfies the following equation: ($n_1 \times t_1$)+($n_2 \times t_2$)=m$\lambda$/2, where $\lambda$ is a designed wavelength, m is a natural number, and wherein at least one of the first and second medium has gain.

This optical amplifying element shows the most ideal characteristics when m is 1 in the equation. Additionally, the optical amplifying element preferably has a reflection symmetry around the center in order to equalize the phase at both ends of the optical amplifying element. Therefore, both ends and the center of the optical amplifying element are preferably made of the first medium.

Particularly, the optical amplifying element has gain grating structure in which an imaginary part of refractive index has a periodical variation, rather than index grating structure in which gain medium is homogeneously distributed and a real part of refractive index has a periodical variation.

Assuming that the optical amplifying element has the gain grating structure and the first medium is gain medium, the thickness ($t_1$) of the first medium should be much less than the designed wavelength ($\lambda$), and preferably given by the following equation: $t_1 \leq \lambda/(4n_1)$.

It is desirable that the beam split ratio of the beam split means is 50:50 and the optical path length difference($\Delta L = L_1 - L_2$) between the first and second paths is preferably given by the following equation: $\Delta L = \lambda/(4n_0)$, where $\lambda$ is a designed wavelength and $n_0$ is an effective refractive index of the optical paths $L_1$ and $L_2$.

According to another embodiment of the present invention, there is provided a low noise optical amplifier for individually amplifying a plurality of optical signals having different wavelengths ($\lambda_1 \sim \lambda_n$) based on each wavelength ($\lambda_i$; here, $1 \leq i$(integer)$\leq n$), which includes an optical amplifying element array ($A_1 \sim A_n$) having a plurality of optical amplifying elements for each wavelength ($\lambda_i$; here, $1 \leq i$ (integer)$\leq n$) to amplify an optical signal of a wavelength ($\lambda_i$) entering through one or both ends ($F_{i1}$, $F_{i2}$) and impose a fixed phase difference on ASE (amplified spontaneous emission) with a wavelength ($\lambda_i$), which is generated within the amplifying element $A_i$; first multiplexing and demultiplexing means to multiplex amplified optical signals and ASEs, which are discharged through one ends ($F_{11} \sim F_{n1}$) of the amplifying elements and transmitted along division paths ($L_{11} \sim L_{n1}$) for each wavelength, into one common path ($L_{c1}$) and divide a plurality of optical signals with different wavelengths transmitted through the common path ($L_{c1}$) based on each wavelength and then demultiplex the optical signals into the division paths for each wavelength; second multiplexing and demultiplexing means to multiplex amplified optical signals and ASEs, which are discharged through the other ends ($F_{12} \sim F_{n2}$) of the amplifying elements and transmitted along division paths ($L_{12} \sim L_{n2}$) for each wavelength, into one common path ($L_{c2}$) and divide a plurality of optical signals with different wavelengths transmitted through the common path ($L_{c2}$) based on each wavelength and then demultiplex the optical signals into the division paths for each wavelength, the first and second multiplexing and demultiplexing means having divided ports ($W_{11} \sim W_{n1}$ and $W_{12} \sim W_{n2}$) for each wavelength to lead in and discharge each beam with different wavelength, and common ports ($W_{c1}$, $W_{c2}$) to lead-in and discharge a plurality of beams with various wavelengths; a beam split means to interfere a plurality of amplified optical signals and ASEs having different wavelengths multiplexed by the first multiplexing and demultiplexing means with a plurality of amplified optical signals and ASEs having different wavelengths multiplexed by the second multiplexing and demultiplexing means, the beam split means having four optical ports ($D_1$, $D_2$, $D_3$, $D_4$), in which a beam entering through either the first port ($D_1$) or the second port ($D_2$) splits into the third port ($D_3$) and the fourth port ($D_4$), whereas a beam entering through either the third port ($D_3$) or the fourth port ($D_4$) splits into the first port ($D_1$) and the second port ($D_2$); a first path including the first division path ($L_{11}$~$L_{n1}$) for optically connecting one ends ($F_{12}$~$L_{n2}$) of the amplifying elements to each of the divided ports ($W_{11}$~$W_{n1}$) of the first multiplexing and demultiplexing means, and the first common path ($L_{c1}$) for optically connecting the common port ($W_{c1}$) of the first multiplexing and demultiplexing means to the first port ($D_1$) of the beam split means; and a second path including the second division path ($L_{12}$~$L_{n2}$) for optically connecting the other ends ($F_{12}$~$F_{n2}$) of the amplifying elements to each of the divided ports ($W_{12}$~$W_{n2}$) of the second multiplexing and demultiplexing means, and the second common path ($L_{c2}$) for optically connecting the common port ($W_{c2}$) of the second multiplexing and demultiplexing means to the second port ($D_2$) of the beam split means.

At this time, a beam separation means can be provided on the first or second common path ($L_{c1}$, $L_{c2}$) in order to separate optical signals entering through the common port ($W_{c1}$, $W_{c2}$) of the first or second multiplexing and demultiplexing means, which is to be amplified, from amplified optical signals and ASEs discharged through the common port ($W_{c1}$, $W_{c2}$) of the first or second multiplexing and demultiplexing means.

Additionally, when adopting an optical amplifying element ($A_i$) imposing a same phase on the ASE with the certain wavelength at both ends ($F_{i1}$, $F_{i2}$), the optical path length difference ($\Delta L_i$) between the first and second paths can be given by the following equation: $\Delta L_1=(L_{i1}+L_{c1})-(L_{i2}+L_{c2})=\lambda_i/(4n_0)$, where $1 \leq i(\text{integer}) \leq n$, $L_{i1}$ and $L_{i2}$ are the length of division paths, $L_{c1}$ and $L_{c2}$ are the length of common path, $\lambda_1$ is a designed wavelength, $n_0$ is an effective refractive index of the optical path.

According to another aspect of the present invention, there is also provided an optical communication system adopting the above-described optical amplifier.

BRIEF DESCRIPTION OF THE DRAWINGS

These and other features, aspects, and advantages of preferred embodiments of the present invention will be more fully described in the following detailed description, taken accompanying drawings. In the drawings.

DESCRIPTION OF THE PREFERRED EMBODIMENT

Hereinafter, preferred embodiments of the present invention will be described in detail with reference to the attached drawings.

Figure 1:
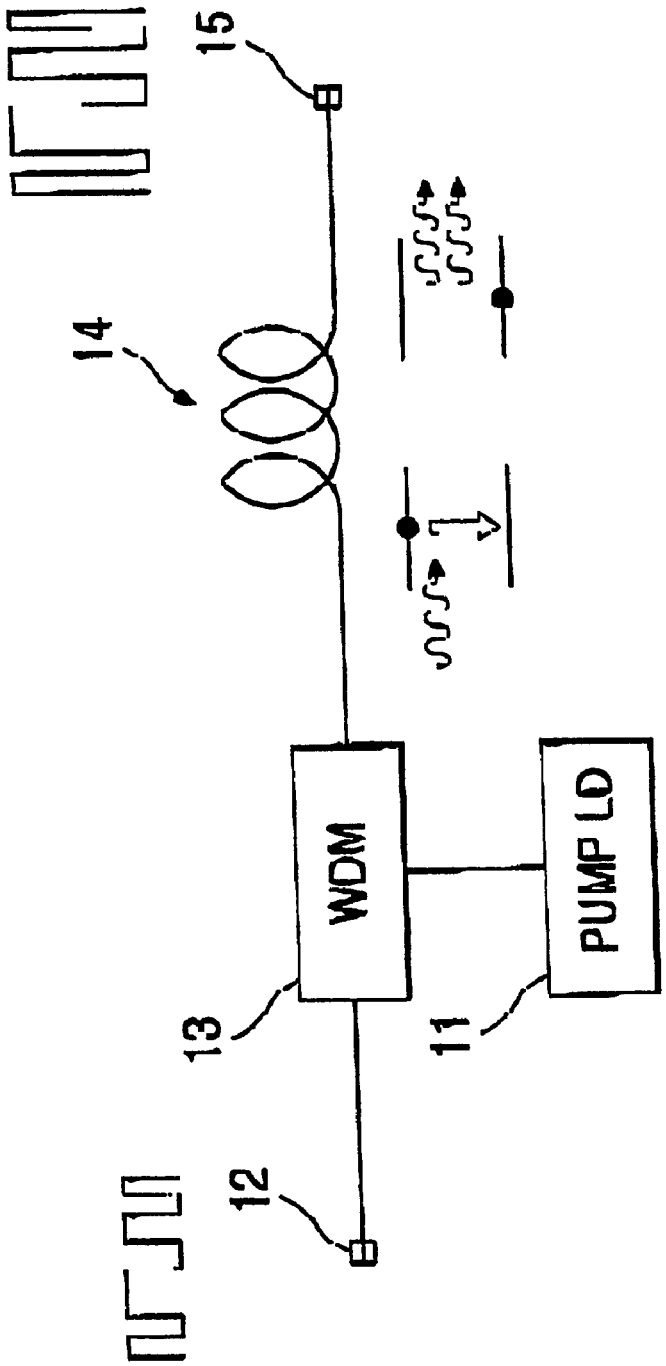
FIG. 1 is a schematic view showing configuration of a common Erbium Doped Fiber Amplifier(EDFA)
Figure 2:
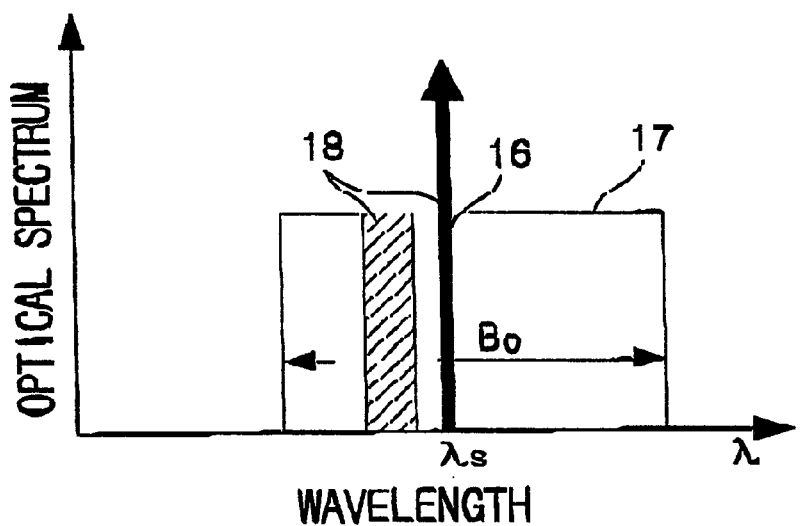
FIG. 2 is a graph representing beat noise between amplified optical signals and ASE spectral components.
Figure 3:
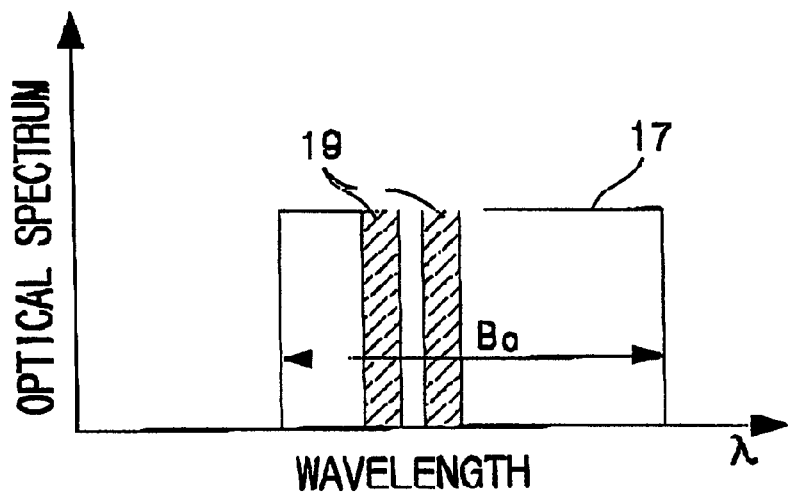
FIG. 3 is a graph representing beat noise between ASE spectral components.
Figure 4:
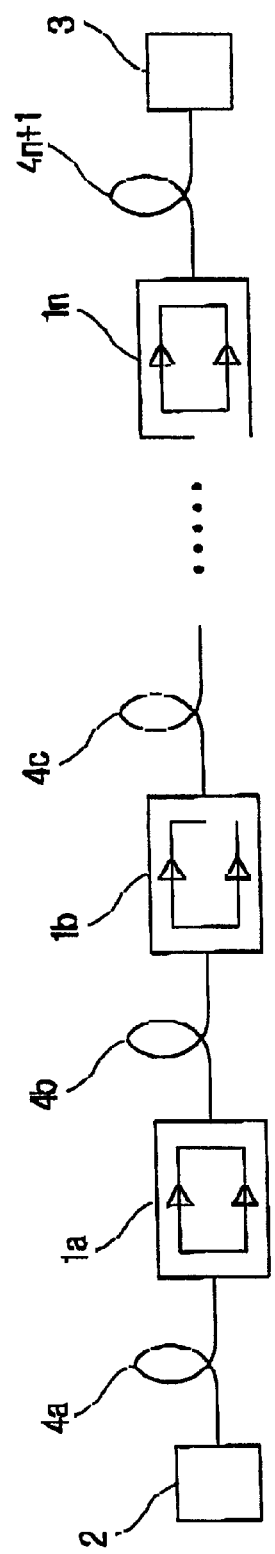
FIG. 4 is a schematic view showing configuration of an optical communication system according to an embodiment of the present invention.

FIG. 4 is a schematic view showing an optical communication system according to the first embodiment of the present invention. In the optical communication system, there are n-stage optical amplifiers (1a~1n) in order, and optical fiber line connect a transmitting station (2) to an optical amplifier (1a); optical amplifiers (1b~1(n-1)) to optical amplifiers (1c~1n); and an optical amplifier (1n) to a receiving station(3), respectively.

Hereinafter, preferred embodiments of the optical amplifier to be adopted in such optical communication system are explained with reference to FIGS. 5 to 13.

Prior to explaining the preferred embodiments, scientific principles of the present invention are reviewed.

Inventors of the present invention came to know that although it is impossible to prevent ASE from being generated in an optical amplifying element, it is possible to separate ASE from output optical signals when ASE from optical amplifying elements possess a certain pattern. When the ASE emanating from both ends of the optical amplifying element has a same intensity and a fixed phase difference, it becomes possible to remove ASE at the port, where the output optical signals are discharged, by using light interference.

In order to put the scientific principle into practice, the inventors placed the optical amplifying element inside a Sagnac interferometer. Thus, by adjusting the optical path length difference from the both ends of the optical amplifying element to the branching point of the Sagnac interferometer, it becomes possible to separate and discharge the ASE and the output optical signals respectively.

For this to happen, an optical amplifying element to be adopted in the present invention should be capable of imposing a certain pattern on the intensity and phase of ASEs discharged through one end ($F_1$) and the other end ($F_2$).

Using the principle described above, when ASEs are separated and eliminated from output optical signals, there would be no ASE shot noise and signal-spontaneous beat noise. Thus the noise figure can be lowered below the theoretical limit of 3 dB.

Hereinafter, the first embodiment of the present invention will be explained in detail with reference to FIGS. 5 to 10.

A First Embodiment

Figure 5:
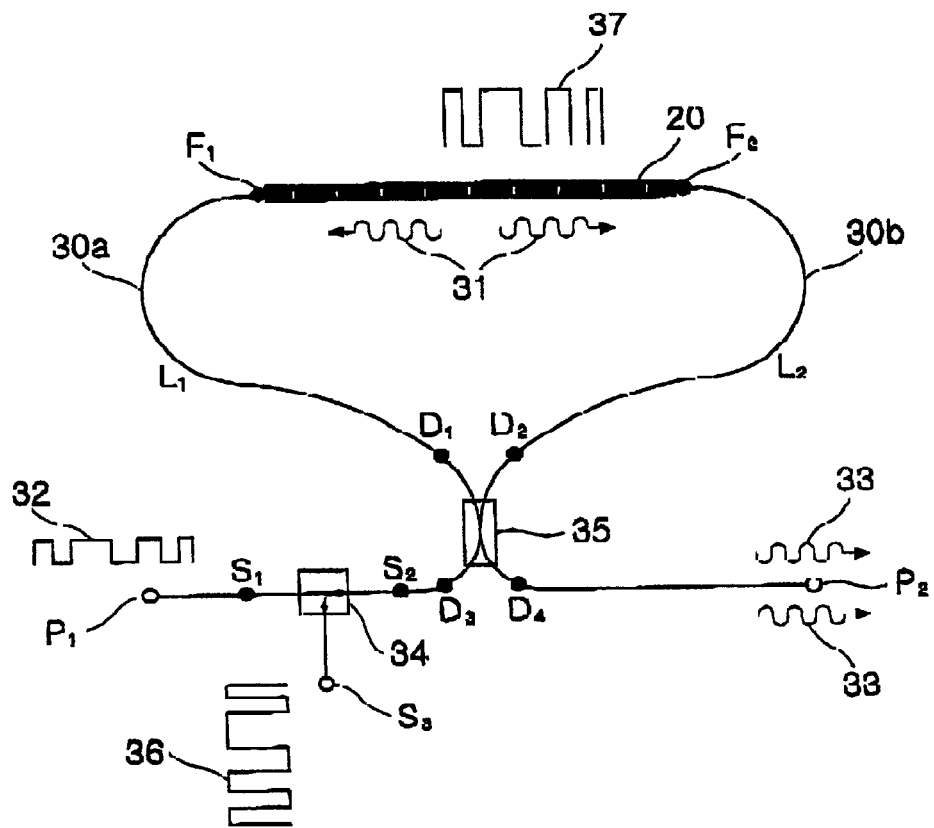
FIG. 5 shows configuration of an optical amplifier according to the first preferred embodiment of the present invention.

As shown in the FIG. 5, an optical amplifier according to the first embodiment includes an optical amplifying element (20); a beam split means (35) having four optical ports ($D_1$, $D_2$, $D_3$, $D_4$); first and second optical paths (30a, 30b) optically connecting both ends ($F_1$, $F_2$) of the optical amplifying element (20) to the first and the second ports ($D_1$, $D_2$) of the beam split means (35); a signal input port ($P_1$) through which an optical signal (32) enters; a noise output port ($P_2$) connected to the fourth port ($D_4$) to discharge ASE (33); and a beam separation means (34) disposed between the signal input port ($P_1$) and the third port ($D_3$).

Incident optical signals (32) from the signal input port ($P_1$), with a predetermined wavelength ($\lambda$), entering through both ends ($F_1$, $F_2$) of the optical amplifying element (20) are amplified to a sufficient gain. Then the amplified optical signals (37) are discharged through both ends ($F_1$, $F_2$) of the optical amplifying element (20). Particularly, the optical amplifying element according to this embodiment needs to produce ASEs of a predetermined wavelength ($\lambda$) to have same intensities and a fixed phase difference. Preferably, the phase difference of ASE is zero. More preferably, the ASEs have same phase and intensity.

Figure 6:
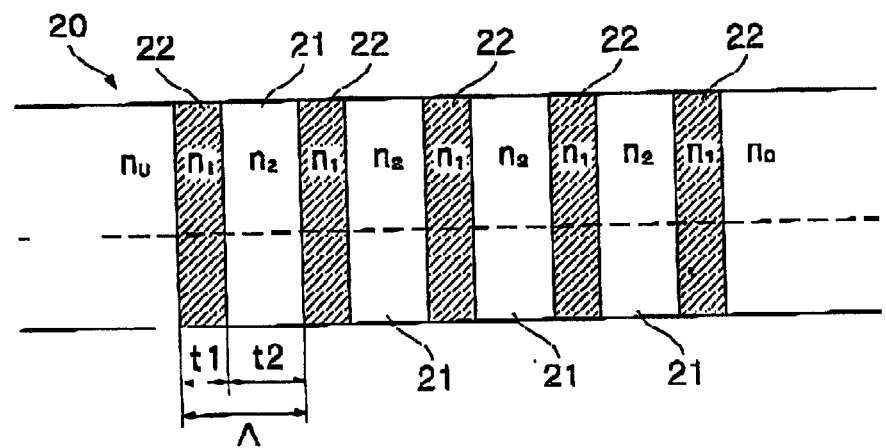
FIG. 6 shows grating structure of the optical amplifying element according to a preferred embodiment of the present invention.

In order to amplify optical signals to a sufficient gain while imposing a certain pattern on the internally generated ASEs as described above, the optical amplifying element preferably has a grating structure as illustrated in FIG. 6, as a concrete embodiment according to the present invention.

In this embodiment, the optical amplifying element (20) has a grating structure in which two media (21, 22) with different effective refractive index ($n_1$ and $n_2$), which is a complex number in general, alternate regularly along the direction of beam propagation. wherein, at least one of the first and second medium has gain.

When the medium (22) has effective refractive index ($n_1$) with thickness ($t_1$) and the medium (21) has effective refractive index ($n_2$) with thickness ($t_2$), the grating constant ($\Lambda = t_1 + t_2$) is approximately given by:

$$(n_1 \times t_1) + (n_2 \times t_2) = \frac{m\lambda}{2} \quad (5)$$

($\lambda$: designed wavelength, m: natural number).

More accurate dispersion relation can be obtained from a rigorous theory based on the Transfer Matrix Method.

The above mentioned optical amplifying element has $m^{th}$ order Bragg grating structure with grating constant $\Lambda$. Particularly, it is most desirable to have 1st order Bragg grating, in which m=1. However, Bragg grating of higher order (m>1) may also be used in case of difficulties in, for example, manufacturing 1st order Bragg grating. Also preferably, the grating structure of the optical amplifying element has reflection symmetry around the center in order to equalize the phases of ASEs discharged from the both ends of the optical amplifying element.

Thus, it is preferable to have both ends ($F_1$, $F_2$) and center of the optical amplifying element (20) made of same medium, (for instance, the first medium in FIG. 6).

Particularly, the amplifying element (20) preferably has a gain grating structure in which gain medium is periodically distributed and an imaginary part of refractive index varies periodically, rather than an index grating structure in which gain medium is homogeneously distributed and a real part of refractive index varies periodically.

Under the assumption that the optical amplifying element (20) has the gain grating structure and the medium (22) is the one with gain, the thickness ($t_1$) of the medium (22) should be less than the designed wavelength ($\lambda$), preferably satisfying the following equation:

$$t_1 \leq \frac{\lambda}{4n_1} \quad (6)$$

The reason of adopting the grating structure in which a plurality of gain media are repeatedly disposed is as follows.

Spontaneous emissions emitted into opposite directions from a lump of gain media has a high degree of coherence, provided the size of the gain medium is small compared to the wavelength of light. This spontaneous emission can be eliminated from the output port by arranging the amplifier structure so that a condition for destructive interference is met. However, with only one lump of gain media, the total gain is restricted. Therefore, several media, each with thickness less than the designed wavelength, are repeatedly and regularly arranged with constant spacing in order to raise the total gain over a useful value while maintaining the coherence properties of ASE. If the spacing between each gain medium is not constant, phase differences among ASEs from each medium have random values, and as a whole, the ASEs discharged from the both ends of the optical amplifying element no longer have coherence. For all the ASEs discharged with certain wavelengths from an individual lump of gain medium to cause destructive interference, it is necessary that the grating period is a multiple of half the wavelength of input signals inside the optical amplifying element. As a result, the optical amplifying element has $m^{th}$ order Bragg grating structure.

Additionally, a phase shift of $\pi/2$ (90°) is preferably applied at the center of the grating structure of the optical amplifying element (20) according to the embodiment in order to increase the total gain and enhance the stability in a designed wavelength. This phase-shifted optical amplifying element has the same merit as the well-known phase-shifted DFB laser.

The optical amplifying element (20) may also include a non-reflection means at both ends to prevent the input optical signals from being reflected and causing a detrimental effect.

The beam split means (35) has four optical ports ($D_1$, $D_2$, $D_3$, $D_4$), in which a beam entering through the first or second port ($D_1$ or $D_2$) splits into the third and fourth ports ($D_3$ and $D_4$) and a beam entering through the third or fourth ports ($D_3$ or $D_4$) splits into the first and second ports ($D_1$ and $D_2$).

In case of FIG. 5, the first port ($D_1$) is connected to a first path (30a); the second port ($D_2$) is connected to a second path (30b); the third port ($D_3$) is connected to the port ($S_2$) of the beam separation means (34); and the fourth port ($D_4$) is connected to the noise output port ($P_2$).

Therefore, the optical signal (32) to be amplified, which enters into the third port ($D_3$) through the port ($S_2$) of the beam separation means (34), splits at a certain ratio by the beam split means (35); propagates through the ports ($D_1$, $D_2$) along the first and second path (30a, 30b); and then enters through the both ends ($F_1$, $F_2$) of the optical amplifying element (20).

The amplified optical signal (37) and ASE, which propagate along the first path (30a), enter through the first port ($D_1$); split at a certain ratio; and then get discharged through ports ($D_3$, $D_4$). Similarly, the amplified optical signal (37) and ASE, which propagate along the second path (30b), enter through the second port ($D_2$); split at a certain ratio; and then get discharged through ports ($D_3$, $D_4$).

Although this embodiment adopts a directional coupler having a certain optical split ratio (particularly, 3 dB coupler to branch the input signal in the ratio of 50:50) as the beam split means (35), other devices may be used in the present invention. For example, the beam splitter, denoted by reference number 105 in FIG. 7 and 203 in FIG. 8, is also available as the beam split means (35).

Additionally, at the fourth port ($D_4$) of the beam split means (35) where constructive interference of ASE (33) occurs, a non-reflection unit may be used to prevent ASE (33) from being reflected back into the beam split means (35).

Figure 7:
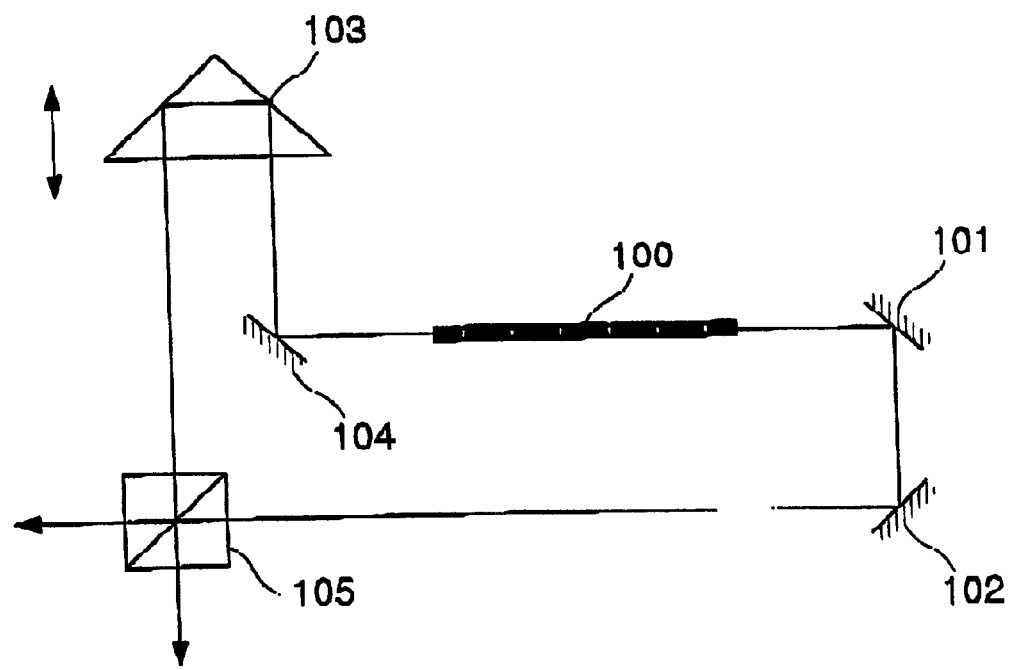
FIG. 7 is a schematic view showing a modified example of the optical amplifier according to the first preferred embodiment.
Figure 8:
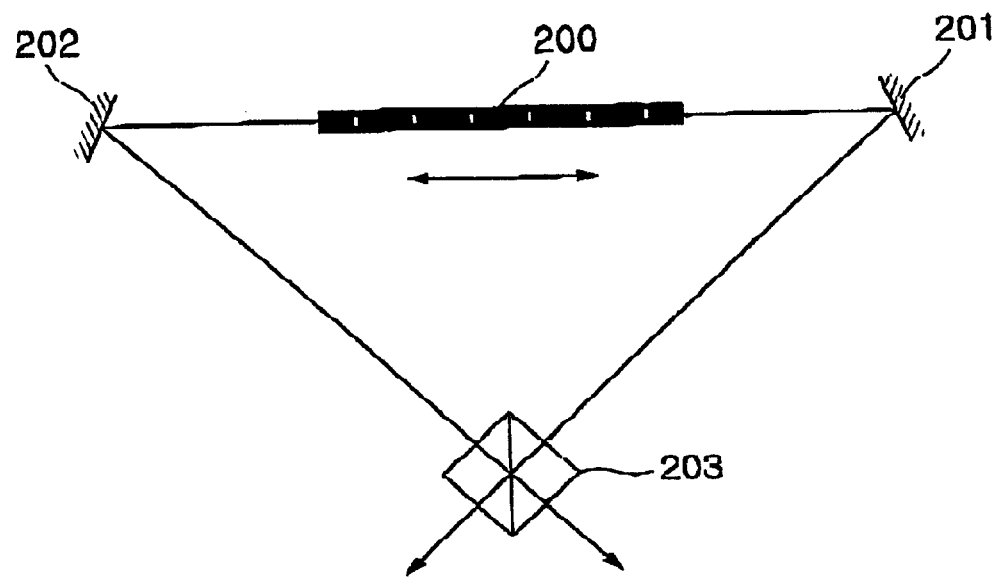
FIG. 8 is a schematic view showing another modified example of the optical amplifier according to the first preferred embodiment.

Optical fiber, optical waveguide, or free space can be used for the first and second paths (30a and 30b) in FIGS. 7 and 8. In fact, any medium that light propagates through can be used as an optical path in the present invention, only if it is not departing from the technical spirit of the present invention.

The optical path length difference ($\Delta L = L_1 - L_2$) between the first path (30a) and the second path (30b) should be designed such that amplified optical signals (37) experience constructive interference at the third port ($D_3$) of the beam split means (35) and destructive interference at the fourth port ($D_4$), whereas the ASEs (31), discharged from the both ends ($F_1$, $F_2$) of the optical amplifying element (20) experience destructive interference at the third port ($D_3$) of the beam split means (35) and constructive interference at the fourth port ($D_4$).

If an optical amplifying element discharges ASEs of same phase through both ends ($F_1$, $F_2$), the optical path length difference ($\Delta L$) between the first path (30a) and the second path (30b) should be given by the following equation:

$$\Delta L = \lambda/(4n_0) \quad (7)$$

($\lambda$: designed wavelength, $n_0$: effective refractive index).

The beam separation means (34) is a device to separate optical signals (32) entering through the signal input port ($P_1$) to be amplified from amplified optical signals (36) discharged through the third port ($D_3$) of the beam split means (35).

The beam separation means (34) has a port ($S_1$) connected to the signal input port ($P_1$); a port ($S_2$) connected to the port ($D_3$) of the beam split means (35); and a port ($S_3$) through which the amplified optical signals (36) are discharged. Therefore, the optical signals (32) entering through the signal input port ($P_1$) to be amplified are input to the third port ($D_3$) of the beam split means (35) through the ports ($S_1$, $S_2$). The amplified optical signals (36) discharged from the third port ($D_3$) of the beam split means (35) is output to the port ($S_3$) through the port ($S_2$).

In the present invention, the beam separation means can be a circulator, a direction coupler, a beam splitter and so on.

The optical amplifier in this embodiment can also be realized in the free space as illustrated in FIGS. 7 and 8.

FIG. 7 shows another example of the first embodiment, which includes an optical amplifying element (100), three mirrors (a first mirror: 101, a second mirror: 102, a third mirror: 104), a retroreflector (103) and a beam splitter (105).

As shown in the figure, optical signals and ASEs discharged from both ends of the optical amplifying element (100) propagate through two different paths: a first path connected through the third mirror (104) and the retroreflector (103) to the beam splitter (105); and a second path connected through the first mirror (101) and the second mirror (102) to the beam splitter (105).

The optical path length difference between the first path and the second path can be adjusted by suitably moving the retroreflector (103) along the arrowed direction. Appropriate optical path length difference results in constructive and destructive interferences of optical signals and ASEs at the ports of the beam splitter (105), thus enabling their separation to different ports.

FIG. 8 shows still another modified example of the first embodiment, which includes an optical amplifying element (200), two mirrors (a first mirror: 202, a second mirror: 201) and a beam splitter (203).

In case of FIG. 8, the optical path length difference between the first path connected from the first mirror (202) and to the beam splitter (203) and the second path connected from the second mirror (201) to the beam splitter (203) can be properly adjusted by moving the optical amplifying element (200) right and left along the arrowed direction. Similar to the above principle, optical signals can be separated from ASE to different ports of the beam splitter (203).

Based on the configuration described above, operational mechanism of low noise optical amplifier in this embodiment will be explained in detail with reference to FIGS. 9 and 10.

For the sake of convenience, it is assumed that a beam split means (35) is 3 dB coupler; phase difference of ASEs discharged from both ends of an optical amplifying element (20) is 0°; and the optical path length difference ($\Delta L = L_1 - L_2$) between the first path and the second path is $\lambda/4n_0$.

Figure 9A:
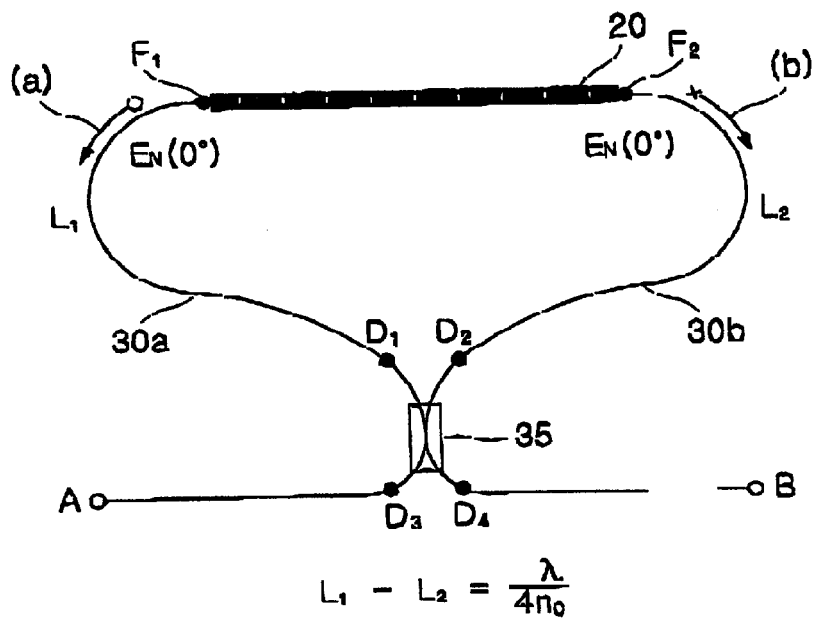
FIGS. 9a to 9c are for illustrating the mechanism of ASE producing constructive and/or destructive interferences at the ports of a beam split means.
Figure 9B:
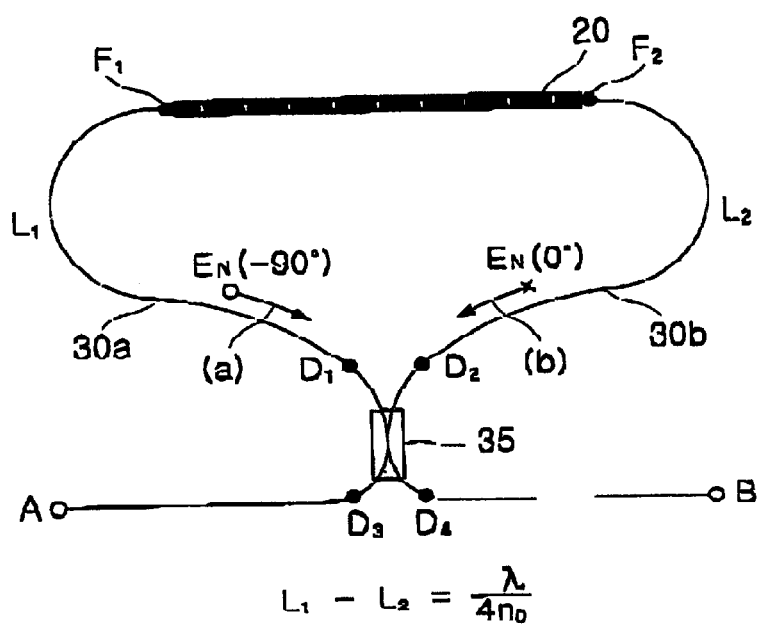
Figure 9C:
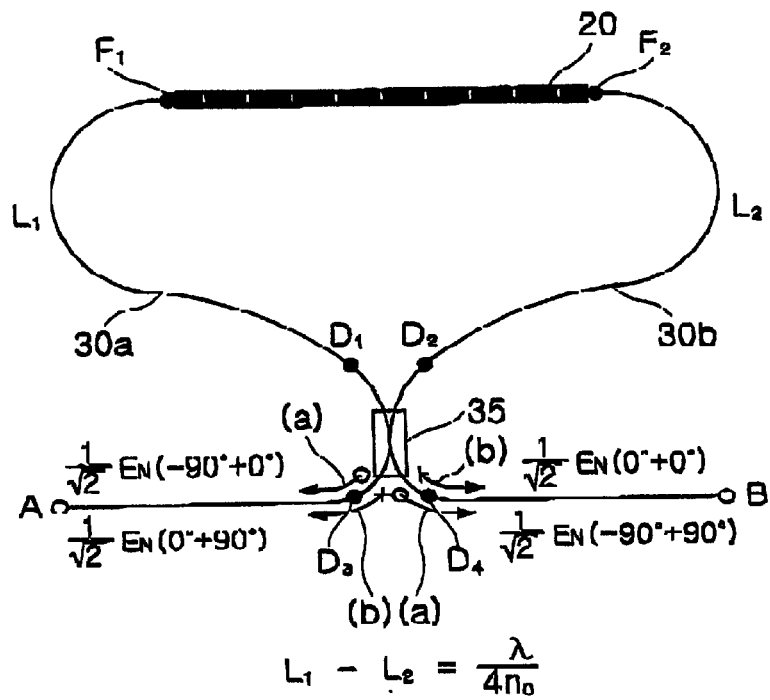

The following part of this description explains the mechanism by which the ASEs discharged from both ends ($F_1$, $F_2$) of the optical amplifying element (20) experiences destructive interference at the port ($D_3$) of the 3 dB coupler (35) and constructive interference at another port ($D_4$), with reference to FIGS. 9a to 9c.

As illustrated in FIG. 9a, ASEs of predetermined wavelength ($\lambda$) are generated in the optical amplifying element (20) of the embodiment and then discharged through both ends of the optical amplifying element (20) with the same intensity and phase. Marks (O and X) are put on the tail of arrows denoting ASE in order to discriminate ASE of predetermined wavelength ($\lambda$) emanating from one end ($F_1$) of the optical amplifying element (20) from ASE of predetermined wavelength ($\lambda$) emanating from the other end ($F_2$).

Field amplitude of the ASE is denoted by $E_N$, and the relative phase is written in parenthesis. At this time, the phase should be understood as a relative value, not an absolute value. In other words, the phase of 0° as written in FIG. 9a means that the phases of ASEs discharged through one end ($F_1$) and the other end ($F_2$), denoted by (a) and (b), are equal to each other, but does not mean that the phase of ASEs generated from two ends ($F_1$ and $F_2$) of the optical amplifying element (20) always stays at the value of 0°. In fact, it is well known that the phase of a traveling wave is a sinusoidal function of time or distance traveled, thus changes continuously with time or distance.

The ASEs (a) and (b) propagate through a first path (30a) of length ($L_1$) and a second path (30b) of length ($L_2$), respectively. When the ASEs arrive at the ports ($D_1$, $D_2$) of the 3 dB coupler (35), they have a phase difference of $\pi/2$ (90°). At this moment, since the first path (30a) is longer than the second path (30b) by as much as $\lambda/(4n_0)$, the phase of ASE at the point ($D_1$) is behind that of the ASE at the point ($D_2$) by as much as $\pi/2$ (90°).

The ASE (a) propagated along the first path (30a), as illustrated in FIG. 9c, now enters the port ($D_1$) of the 3 dB coupler (35), and is branched into and discharged through the ports ($D_3$ and $D_4$) at a split ratio of 50:50. At this moment, the phase of ASE (a) branched to the port ($D_4$) advances faster than that of the ASE (a) branched to the port ($D_3$) by as much as $\pi/2$ (90°). Alternatively, the coupler can be designed in such a way that the above-mentioned phase is delayed by as much as $\pi/2$ (90°) than the other. But, it is assumed that the coupler has an advancing phase for convenience. The coupler with delayed phase needs adjustment of the corresponding path length difference, and its change of configuration is obvious and not described in detail.

In a similar way, the ASE (b) propagated along the second path (30b), as illustrated in FIG. 9c, enters the port ($D_2$) of the 3 dB coupler (35) and is branched into and discharged through the ports ($D_3$ and $D_4$) at a split ratio of 50:50. At this moment, the phase of ASE (b) branched to the port ($D_3$) advances that of the ASE (b) branched to the port ($D_4$) by as much as $\pi/2$ (90°).

This results in an accumulated phase difference of 180° at the port ($D_3$) of the 3 dB coupler (35) between the ASE (a) and (b), thus causing destructive interference. On the while, the ASE (a) and (b) discharged through the port ($D_4$) of the 3 dB coupler (35) experiences constructive interference since there exists no accumulated phase difference.

Figure 10A:
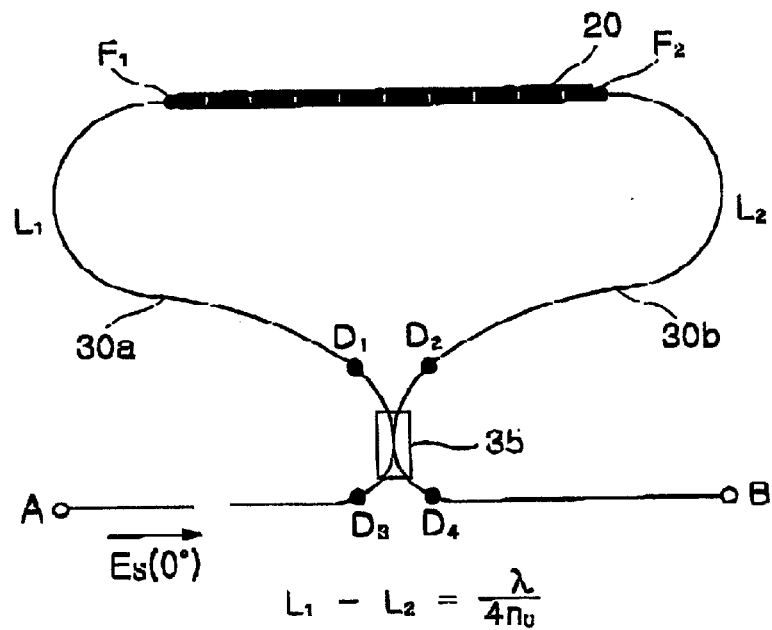
FIGS. 10a to 10f are for illustrating the mechanism of amplified input signals producing constructive and/or destructive interferences at the ports of the beam split means.

Subsequently, FIG. 10a illustrates that optical signals of predetermined wavelength to be amplified enters the 3 dB coupler (35) through an input port (A). The field amplitude of the optical signal is denoted as $E_S$.

Figure 10B:
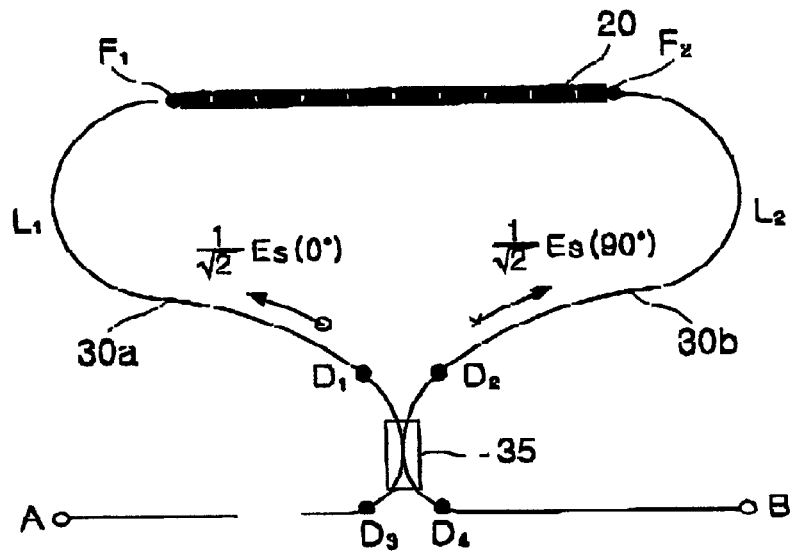

The optical signal input in such a way enters the 3 dB coupler (35) and is then branched into the first path (30a) and the second path (30b) at a split ratio of 50:50, as illustrated FIG. 10b. At this time, the phase of the optical signal (b) branched to the port ($D_2$) also advances that of the optical signal (a) branched to the port ($D_1$) by as much as $\pi/2$ (90°).

Figure 10C:
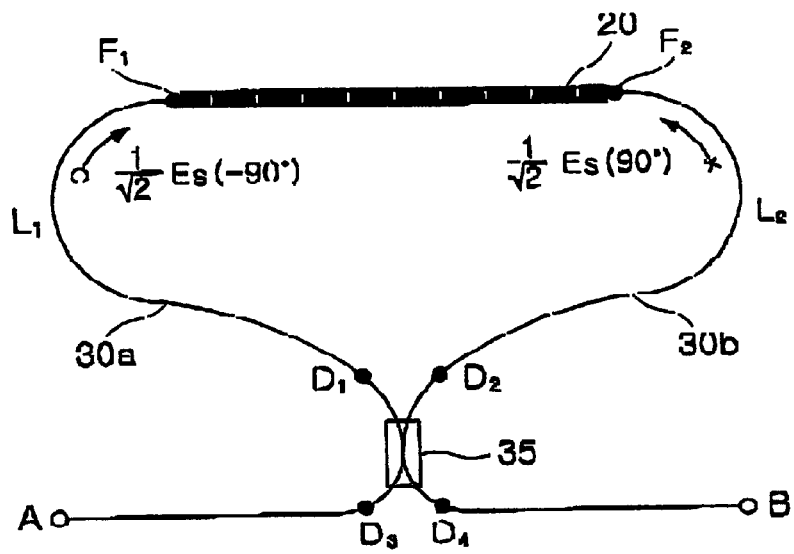

In addition, since the first path (30a) is longer than the second path (30b) by as much as $\lambda/(4n_0)$, when two optical signals arrive at both ends ($F_1$, $F_2$) of the optical amplifying element, the phase of optical signals propagated to the first path (30a) is delayed behind the phase of optical signals propagated to the first path (30b) by as much as $\pi/2$ (90°). Therefore, as illustrated in FIG. 10c, the phase of the optical signal arriving one end ($F_1$) of the optical amplifying element is delayed behind the phase of optical signal arriving at the other end ($F_2$) of the optical amplifying element by as much as $\pi$ (180°) in total. After all, optical signals arriving at both ends ($F_1$, $F_2$) of the optical amplifying element (20) have same intensity, but an opposite phase each other.

Figure 10D:
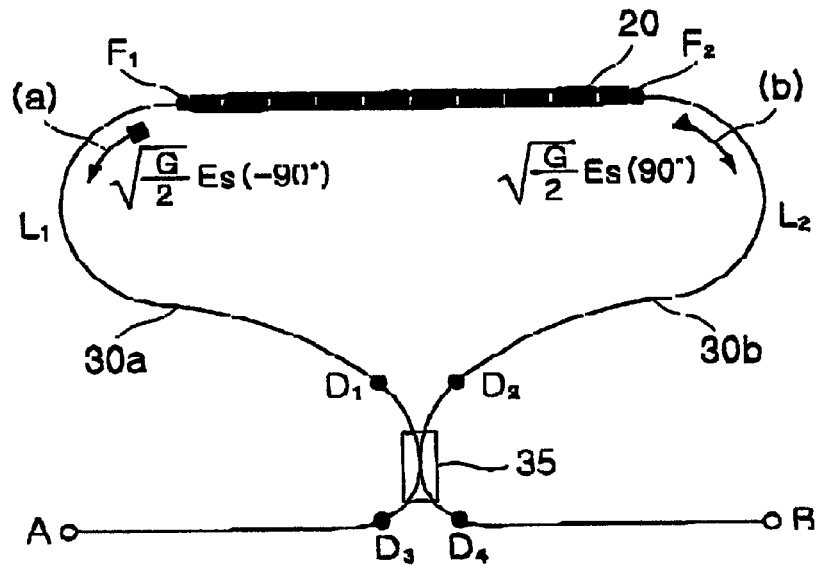

In case that the optical amplifying element (20) is a symmetric complex Bragg grating amplifier, the amplified optical signals discharged through both ends ($F_1$, $F_2$) of the optical amplifying element (20) also have phase difference by as much as $\pi$ (180°) in total, but same intensity. In FIG. 10d, G denotes the gain of the optical amplifying element (20).

Figure 10E:
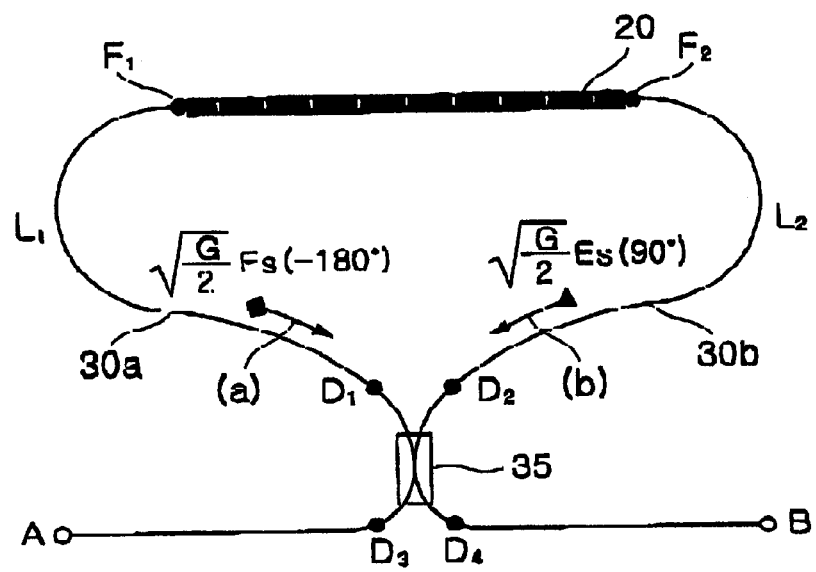

The amplified optical signals (a) and (b) discharged from both ends ($F_1$, $F_2$) of the optical amplifying element (20) are propagated through the first path (30a) of length ($L_1$) and the second path (30b) of length ($L_2$), respectively. When the amplified optical signals arrive at the ports ($D_1$ and $D_2$) of the 3 dB coupler (35), as illustrated in FIG. 10e, they have phase difference by as much as $\pi/2$ (90°) each other. In other words, the phase of optical signals (a) at the point ($D_1$) is delayed behind that of optical signals (b) at the point ($D_2$) by as much as $\pi/2$ (90°) since the first path (30a) is longer than the second path (30b) by as much as $\lambda/(4n_0)$.

Figure 10F:
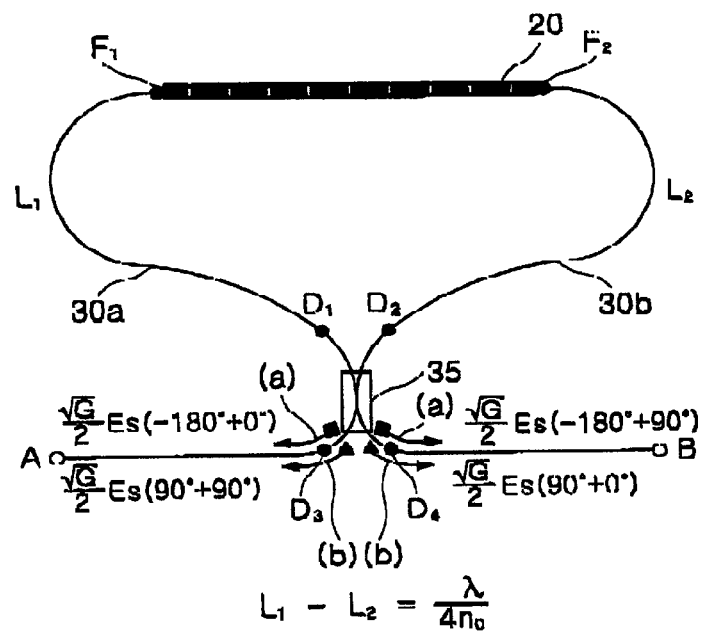

The optical signals (a) propagated along the first path (30a), as illustrated in FIG. 10f, enter the port ($D_1$) of the 3 dB coupler (35), and are branched into and discharged through the ports ($D_3$ and $D_4$) at a split ratio of 50:50. At this time, the phase of optical signal (a) branched into the port ($D_4$) advances that of the optical signal (a) branched into the port ($D_3$) by as much as $\pi/2$ (90°).

At the same time, the optical signals (b) propagated along the second path (30b), as illustrated in FIG. 10f, also enter the port ($D_2$) of 3 dB coupler (35) and are then branched into and discharged through the ports ($D_3$ and $D_4$) at a split ratio of 50:50. The phase of optical signals (b) branched to the port ($D_3$) go in advance of optical signals (b) branched to the port ($D_4$) by as much as $\pi/2$ (90°).

Consequently, the optical signals (a) and (b) discharged through the port ($D_3$) of the 3 dB coupler (35) have no accumulated phase difference, thus experiencing constructive interference, while the optical signals (a) and (b) discharged through the port ($D_4$) of the 3 dB coupler (35) have accumulated phase difference of $\pi$ (180°), thus experiencing destructive interference.

After all, the amplified optical signals of opposite phase discharged from both ends ($F_1$, $F_2$) experience constructive interference at the input port (A) of the optical signals and destructive interference at the noise output port (B), as illustrated FIGS. 10d to 10f.

As described above with reference to FIGS. 9 to 10, the amplified optical signals experience constructive interference at the port ($D_3$) of the 3 dB coupler (35), whereas the amplified ASEs are eliminated by destructive interference at the port ($D_3$) of the 3 dB coupler (35). Also, the amplified ASEs experience constructive interference at the port ($D_4$) of the 3 dB coupler (35), whereas the amplified optical signals are eliminated by destructive interference at the port ($D_4$) of the 3 dB coupler (35).

Subsequently, the optical signals input to the port ($D_3$) of the 3 dB coupler (35) are amplified by the optical amplifying element and then discharged through the port ($D_3$), while the ASEs generated by the optical amplifying element are discharged through the port ($D_4$). After all, since the optical amplifier according to this embodiment of the present invention effectively removes ASE which causes degradation of the SNR of the amplified output optical signal, it becomes possible to lower the noise figure of the optical amplifier down under the theoretical limit of 3 dB.

A Second Embodiment

Hereinafter, an optical amplifier according to a second embodiment of the present invention is explained in detail with reference to FIG. 11.

As illustrated in the figure, an optical amplifier according to the second embodiment has the same configuration as in case of the first embodiment except that a beam separation means (54) is located on a first path (50a) to separate input optical signals from amplified optical signals.

Figure 11:
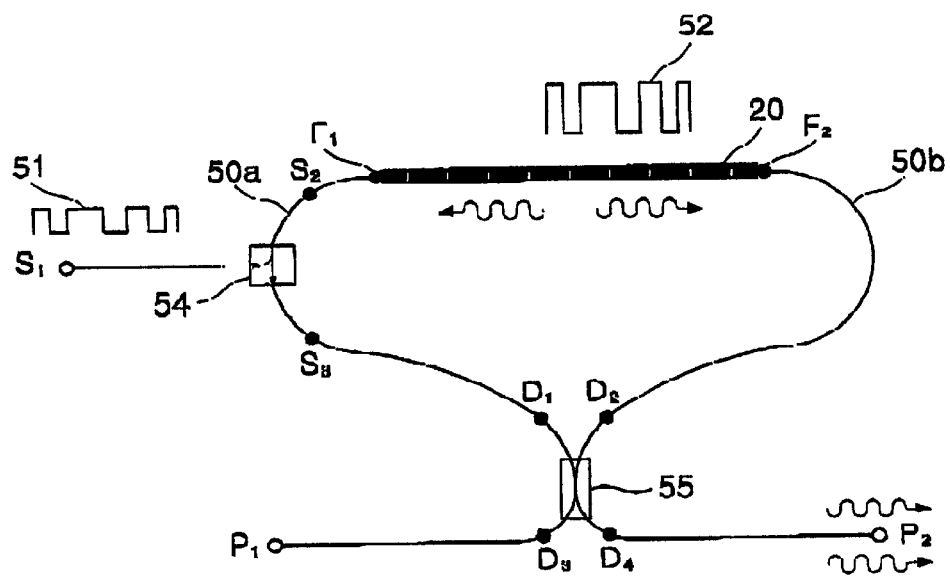
FIG. 11 shows configuration of an optical amplifier according to the second preferred embodiment of the present invention.

Though it is shown that the beam separation means (54) is located on the first path (50a) in FIG. 11, it does not matter even if the beam separation means (54) is located on the second path (50b).

In any case, the intensity of amplified optical signal and ASE propagating along the optical path (for instance, the first path) on which the beam separation means (54) is located may be different from that of amplified optical signal and ASE propagating along the optical path (for instance, the second path) on which the beam separation means (54) is not located. Thus, by adjusting the split ratio of the beam split means (55), the intensities of ASEs, which propagate along the first path (50a) and the second path (50b) respectively and are discharged through the port ($D_3$) of the beam split means (55) can be equalized in this embodiment.

A Third Embodiment

Figure 12:
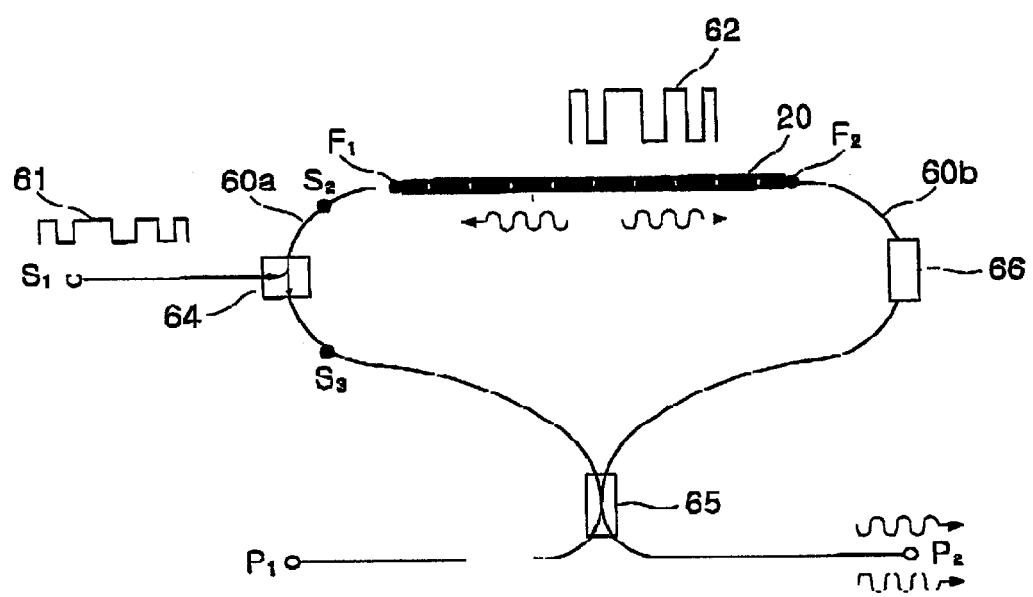
FIG. 12 shows configuration of an optical amplifier according to the third preferred embodiment of the present invention.

An optical amplifier of a third embodiment according to the present invention is now explained in detail with reference to FIG. 12.

In case of the optical amplifier according to the second embodiment, a beam separation means is located on either of the first and second paths, and the split ratio of the beam split means is adjusted in order to compensate the difference in the intensities of the ASEs due to the asymmetry of the configuration.

In the optical amplifier according to the third embodiment, a beam separation means (64) is located on either of the two paths (60a, 60b) (a first path is chosen in the figure), and a beam attenuation means (66) is located on either of the two paths (60a, 60b) (the second path is chosen in the figure).

The beam attenuation means (66) is capable of offsetting the difference between the intensities of ASEs, caused by locating the beam separation means (64) so that the intensities of ASEs become equal when the ASEs arrive at the beam split means (65) along the first path (60a) and the second path (60b) respectively. Thus, the beam separation means (64) and the beam attenuation means (66) may or may not be placed on the same path. It is self-evident from the gist of the present invention that the beam attenuation means (66) should be placed on a path having higher intensity of ASE regardless of existence of the beam separation means.

The beam attenuation means according to this embodiment can be a circulator, a directional coupler, a beam splitter etc. or a direct optical attenuator can also be used.

The optical amplifier according to the third embodiment has configuration and operational mechanism substantially identical to the case of the second embodiment except that the beam separation means (64) and the beam attenuation means (66) may be placed on either of the first path (60a) and the second path (60b).

A Fourth Embodiment

Figure 13:
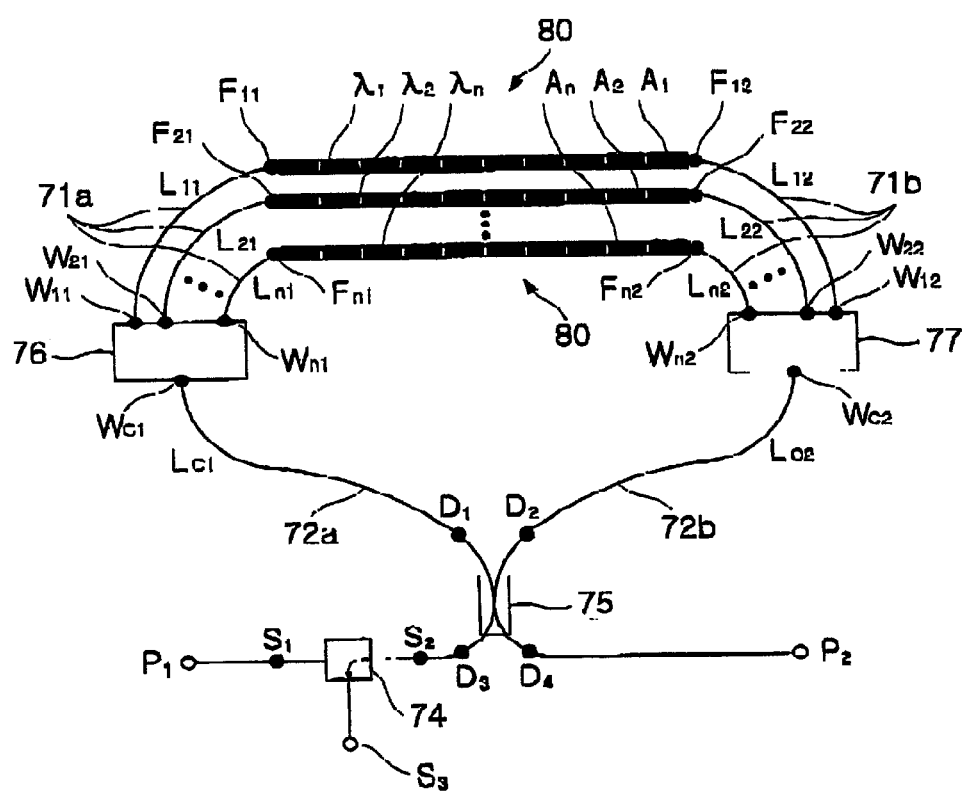
FIG. 13 shows configuration of an optical amplifier to be used for Wavelength Division Multiplexing (WDM) or Dense Wavelength Division Multiplexing (DWDM) communication system according to the fourth preferred embodiment of the present invention.

FIG. 13 shows a multiple-wavelength optical amplifier suitable for use in Wavelength Division Multiplexing (WDM) or Dense Wavelength Division Multiplexing (DWDM) optical communication system.

As illustrated in the figure, the multiple-wavelength optical amplifier includes an optical amplifying element array (80) having a plurality of optical amplifying elements ($A_1 \sim A_n$) with wavelengths ($\lambda_1 \sim \lambda_n$); first and second paths consisting of several division paths (71a, 71b) for each wavelength and one common path (72a, 72b); first and second multiplexing and demultiplexing means (76 and 77) for optically connecting the division paths and the common path; a beam split means (75) having four optical ports ($D_1$, $D_2$, $D_3$, $D_4$); a signal input port ($P_1$) to which a signal to be amplified is inputted; a noise output port ($P_2$) connected to the fourth port ($D_4$) of the beam split means (75) to discharge amplified ASE outward; and a beam separation means (74) located between the signal input port ($P_1$) and the third port ($D_3$) of the beam split means (75).

The optical amplifying element array (80) consists of a plurality of optical amplifying elements ($A_1 \sim A_n$) each for different wavelengths ($\lambda_1 \sim \lambda_n$).

Each of the first and second multiplexing and demultiplexing means (76, 77) has a plurality of divided ports ($W_{11} \sim W_{n1}$ and $W_{12} \sim W_{n2}$) and one common ports ($W_{c1}$, $W_{c2}$). Each of the divided ports ($W_{11} \sim W_{n1}$ and $W_{12} \sim W_{n2}$) is connected to corresponding division path (71a, 71b), and the common port ($W_{c1}$, $W_{c2}$) is connected to the common path (72a, 72b) respectively.

Each length of the first and second paths is the sum of the length of the division path (71a and 71b) and the length of the common path (72a, 72b), respectively. That is, the length of the first path is $L_{i1}+L_{c1}$ and that of the second path is $L_{i2}+L_{c2}$ (here, $1 \leq i(\text{integer}) \leq n$).

Under the assumption that the phases at both ends ($F_{i1}$ and $F_{i2}$) of each optical amplifying element are equal, the optical path difference ($\Delta L_i$) between the first and second paths is given by the following equation:

$$\Delta L_i = (L_{i1}+L_{c1}) - (L_{i2}+L_{c2}) = \lambda_i/4n_0 \tag{8}$$

(here, $1 \leq i$ (integer)$\leq n$, $L_{i1}$, $L_{i2}$: the length of division path, $L_{c1}$, $L_{c2}$: the length of common path, $\lambda_1$: designed wavelength, $n_0$: effective refractive index of the optical path)

The beam separation means (74) in this embodiment may be modified to be located between the first and second paths instead of between the signal input port ($P_1$) and the beam split means (75), like the second and third embodiment.

In such modified configuration of this embodiment corresponding to the second and third embodiment, the beam separation means (74) should be placed on either of the first common path (72a) and the second common path (72b).

At this time, in order to compensate the difference in the intensities of ASEs caused by the beam separation means (74), the split ratio of the beam split means may be adjusted as in the case of the second embodiment or a beam attenuation means may be located on the first or second common path (72a or 72b) as in the case of the third embodiment.

Based on the technical configuration described above, the operational mechanism of the multiple-wavelength optical amplifier according to this embodiment will now be described.

An optical signal input to the signal input port ($P_1$) to be amplified enters the third port ($D_3$) of the beam split means (75) through the ports ($S_1$, $S_2$) of the beam separation means (74). The optical signal to be amplified is a multiple-wavelength optical signal. The optical signal input to the port ($D_3$) in this manner is then split into the ports ($D_1$, $D_2$) and propagated through the first common path (72a) and the second common path (72b).

The optical signal of multiple wavelengths propagated through the first common path (72a) enters the common port ($W_{c1}$) of the first multiplexing and demultiplexing means (76), which divides the optical signal of multiple wavelengths into each wavelength and outputs the divided signals through the division ports ($W_{11} \sim W_{n1}$) to the first division path (71a) for each wavelength. The optical signals of different wavelengths propagated through the first division path (71a) then enter each optical amplifying element through one end ($F_{11} \sim F_{n1}$) of the corresponding amplifying elements connected to each division path (71a).

In the meantime, the optical signal of multiple wavelengths propagated through the second common path (72b) enters the common port ($W_{c2}$) of the second multiplexing and demultiplexing means (77), which divides the optical signal of multiple wavelengths into each wavelength and outputs the divided signals through the division ports ($W_{12} \sim W_{n2}$) to the second division path (71b) for each wavelength. The optical signals of different wavelengths propagated through the second division path (71b) then enter each optical amplifying element through one end ($F_{12} \sim F_{n2}$) of the corresponding amplifying elements connected to each division path (71b).

The optical signals of different wavelengths, input to the optical amplifying elements ($A_1 \sim A_n$), are amplified by the corresponding optical amplifying elements. The optical signals amplified in this manner are then discharged through both ends ($F_{11} \sim F_{n1}$, $F_{12} \sim F_{n2}$) of each corresponding amplifying element along with the amplified ASEs. The discharged optical signals and ASEs propagate along the corresponding division paths (71a, 71b) into the division ports ($W_{11} \sim W_{n1}$, $W_{12} \sim W_{n2}$) of the multiplexing and demultiplexing means (76, 77). After being multiplexed by the multiplexing and demultiplexing means (76, 77), the multiplexed optical signals and ASEs are discharged out to the common paths (72a, 72b) through the common ports ($W_{c1}$, $W_{c2}$).

The optical amplifying elements ($A_i$), the beam split means, the beam separation means and the beam attenuation means, adopted in this embodiment, have substantially the same configuration and working mechanism as those of the first to third embodiments. In fact, the present embodiment is based on the same principle as the first embodiment except that the optical signals to be amplified are of multiple wavelengths.

Additionally, it is possible to make various modifications of this embodiment by adopting a prism or a grating structure corresponding to the multiplexing and demultiplexing means to the optical amplifiers shown in FIGS. 7 and 8.

Therefore, the explanation of the configuration and working mechanism of the optical amplifier according to this embodiment repeated with those of the first to third embodiments will be omitted.

The optical amplifiers described in the first to fourth embodiments may be preferably realized in the Planar Lightwave Circuit (PLC) configuration. The PLC can be produced based on either silica or compound semiconductor.

It can also be produced using polymer at a low cost.

Particularly, in case the optical amplifier is built on a silica-based PLC, the optical amplifier with the grating structure is manufactured by doping gain materials of rare earth elements such as Er, Yb, and Pr, after etching the grating structure in the core of the waveguide.

In case the optical amplifier is built on a compound semiconductor-based PLC, the optical amplifying element can be manufactured by forming Distributed FeedBack Semiconductor Optical Amplifier (DFB SOA).

Also, the optical amplifying element according to the present invention can be manufactured by Hybrid Integration of a silica-based PLC and a DFB SOA based on InP/InGaAsP.

In sum, the optical amplifier according to the present invention eliminates the ASEs, inevitably generated by the amplifying process of optical signals, from output optical signals. Since such a low noise optical amplifier effectively prevents the formation of shot and beat noise caused by ASE, degradation of SNR or signal distortion due to use of the optical amplifier does not happen.

Additionally, the amplifier may alleviate the gain saturation by accumulated ASE, occurring when a plurality of optical amplifiers are cascaded in long-haul communication systems.

The optical amplifier according to the present invention has a great advantage in that it eliminates the problem of high noise figure, which has been the biggest obstacle up to now in commercializing a semiconductor optical amplifier. Other advantages include high efficiency of integration, low production cost and flexible choice of wavelength, which are great merits of the semiconductor optical amplifier.

The preferred embodiment of the present invention has been described in detail with reference to the attached drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A low noise optical amplifier for amplifying optical signals with a predetermined wavelength ($\lambda$), comprising:
   an optical amplifying element to amplify optical signals with a predetermined wavelength ($\lambda$) entering through one or both of ends ($F_1$, $F_2$), and impose a fixed phase difference on ASE (amplified spontaneous emission) with the predetermined wavelength ($\lambda$), which is generated within the optical amplifying element and emitted through both ends ($F_1$, $F_2$);
   a beam split means to interfere amplified optical signals and ASE from one end ($F_1$) of the optical amplifying element with those from the other end ($F_2$) of the optical amplifying element,
   the beam split means having four optical ports ($D_1$, $D_2$, $D_3$, $D_4$), in which a beam entering through either the first port ($D_1$) or the second port ($D_2$) splits into the third port ($D_3$) and the fourth port ($D_4$), and a beam entering through either the third port ($D_3$) or the fourth port ($D_4$) splits into the first port ($D_1$) and the second port ($D_2$);
   a first path of length ($L_1$) optically connecting one end ($F_1$) of the optical amplifying element to the first port ($D_1$) of the beam split means; and
   a second path of length ($L_2$) optically connecting the other end ($F_2$) of the optical amplifying element to the second port ($D_2$) of the beam split means,
   wherein the path length difference between the first and second path ($L_1$ and $L_2$) is designed so that the amplified optical signals have constructive interference at the third port ($D_3$) of the beam split means and destructive interference at the fourth port ($D_4$), whereas the internally generated ASE having the same wavelength as the signal has destructive interference at the third port ($D_3$) of the beam split means and constructive interference at the fourth port ($D_4$).

2. A low noise optical amplifier according to claim 1, further comprising a beam separation means to separate optical signals entering through the third port ($D_3$) of the beam split means, to be amplified, from amplified optical signals discharged through the third port ($D_3$).

3. A low noise optical amplifier according to claim 2, wherein the beam separation means has at least three ports ($S_1$, $S_2$, $S_3$), in which a portion or all of optical signals entering through one port ($S_1$), which is to be amplified, is discharged through another port ($S_2$), while a portion or all of optical signals entering through another port ($S_2$), which is already amplified, is discharged through the other port ($S_3$).

4. A low noise optical amplifier according to claim 1, further comprising a non-reflection means connected to the fourth port ($D_4$) of the beam split means to prevent the ASE from being reflected toward the beam split means.

5. A low noise optical amplifier according to claim 1, further comprising a beam separation means provided on the first or second path ($L_1$, $L_2$) for separating optical signals entering through one or the other end ($F_1$, $F_2$) of the optical amplifying element, which is to be amplified, from amplified optical signals and ASE discharged through one or the other end ($F_1$, $F_2$) of the optical amplifying element.

6. A low noise optical amplifier according to claim 5, wherein the beam split means has a beam splitting ratio to make the intensity of ASE, which enters through the first port ($D_1$) and gets discharged through the third port ($D_3$) of the beam split means, equal to the intensity of ASE, which enters through the second port ($D_2$) and gets discharged through the third port ($D_3$) of the beam split means.

7. A low noise optical amplifier according to claim 5, further comprising a beam attenuation means located on the first or second path ($L_1$, $L_2$) to attenuate optical signals and ASE so that the intensity of ASE, which enters through the first port ($D_1$) and gets discharged through the third port ($D_3$) of the beam split means, is equal to the intensity of ASE, which enters through the second port ($D_2$) and gets discharged through the third port ($D_3$) of the beam split means.

8. A low noise optical amplifier according to claim 7, wherein the beam separation means and the beam attenuation means are couplers.

9. A low noise optical amplifier for individually amplifying a plurality of optical signals having different wavelengths ($\lambda_1 \sim \lambda_n$) based on each wavelength ($\lambda_i$; here, $1 \leq i$ (integer)$\leq n$), comprising:
   an optical amplifying element array ($A_1 \sim A_n$) having a plurality of optical amplifying elements for each wavelength ($\lambda_i$; here, $1 \leq i$(integer)$\leq n$) to amplify an optical signal of a wavelength ($\lambda_i$) entering through one or both of ends ($F_{i1}$, $F_{i2}$) and impose a fixed phase difference on ASE (amplified spontaneous emission) with a wavelength ($\lambda_i$), which is generated within the optical amplifying element;
   first multiplexing and demultiplexing means to multiplex amplified optical signals and ASEs, which are discharged through one ends ($F_{11} \sim F_{n1}$) of the amplifying elements and transmitted along division paths ($L_{11} \sim L_{n1}$) for each wavelength, into one common path ($L_{c1}$) and divide a plurality of optical signals with different wavelengths transmitted through the common path ($L_{c1}$) based on each wavelength and then demultiplex the optical signals into the division paths for each wavelength;

second multiplexing and demultiplexing means to multiplex amplified optical signals and ASEs, which are discharged through the other ends ($F_{12}$~$F_{n2}$) of the amplifying elements and transmitted along division paths ($L_{12}$~$Ln_2$) for each wavelength, into one common path ($L_{c2}$) and divide a plurality of optical signals with different wavelengths transmitted through the common path ($L_{c2}$) based on each wavelength and then demultiplex the optical signals into the division paths for each wavelength, the first and second multiplexing and demultiplexing means having divided ports ($W_{11}$~$W_{n1}$ and $W_{12}$~$W_{n2}$) for each wavelength to lead in and discharge each beam with different wavelength, and common ports ($W_{c1}$, $W_{c2}$) to lead-in and discharge a plurality of beams with various wavelengths;

a beam split means to interfere a plurality of amplified optical signals and ASEs having different wavelengths multiplexed by the first multiplexing and demultiplexing means with a plurality of amplified optical signals and ASEs having different wavelengths multiplexed by the second multiplexing and demultiplexing means, the beam split means having four optical ports ($D_1$, $D_2$, $D_3$, $D_4$), in which a beam entering through either the first port ($D_1$) or the second port ($D_2$) splits into the third port ($D_3$) and the fourth port ($D_4$), whereas a beam entering through either the third port ($D_3$) or the fourth port ($D_4$) splits into the first port ($D_1$) and the second port ($D_2$);

a first path including the first division paths ($L_{11}$~$L_{n1}$) for optically connecting one ends ($F_{11}$~$F_{n1}$) of the amplifying elements to each of the divided ports ($W_{11}$~$W_{n1}$) of the first multiplexing and demultiplexing means, and the first common path ($L_{c1}$) for optically connecting the common ports ($W_{c1}$) of the first multiplexing and demultiplexing means to the first port ($D_1$) of the beam split means; and a second path including the second division paths ($L_{12}$~$L_{n2}$) for optically connecting the other ends ($F_{12}$~$F_{n2}$) of the amplifying elements to each of the divided ports ($W_{12}$~$W_{n2}$) of the second multiplexing and demultiplexing means, and the second common path ($L_{c2}$) for optically connecting the common port ($W_{c2}$) of the second multiplexing and demultiplexing means to the second port ($D_2$) of the beam split means, wherein the optical path length difference between the first and second path is designed so that the amplified optical signals have constructive interference at the third port ($D_3$) of the beam split means and destructive interference at the fourth port ($D_4$), whereas the ASEs have destructive interference at the third port ($D_3$) of the beam split means and constructive interference at the fourth port ($D_4$).

10. A low noise optical amplifier according to claim 9, further comprising a beam separation means to separate optical signals entering through the third port ($D_3$) of the beam split means, to be amplified, from amplified optical signals discharged through the third port ($D_3$).

11. A low noise optical amplifier according to claim 10, wherein the beam separation means has at least three ports ($S_1$, $S_2$, $S_3$), in which a portion or all of optical signals entering through one port ($S_1$), which is to be amplified, is discharged through another port ($S_2$), while a portion or all of optical signals entering through another port ($S_2$), which is already amplified, is discharged through the other port ($S_3$);

12. A low noise optical amplifier according to claim 9, further comprising a non-reflection means connected to the fourth port ($D_4$) of the beam split means to prevent the ASE from being reflected toward the beam split means.

13. A low noise optical amplifier according to claim 9, further comprising a beam separation means provided on the first or second common path ($L_{c1}$, $L_{c2}$) for separating optical signals entering through the common port ($W_{c1}$, $W_{c2}$) of the first or second multiplexing and demultiplexing means, which is to be amplified, from amplified optical signals and ASEs discharged through the common port ($W_{c1}$, $W_{c2}$) of the first or second multiplexing and demultiplexing means.

14. A low noise optical amplifier according to claim 13, wherein the beam split means has a beam splitting ratio to make the intensity of ASE, which enters through the first port ($D_1$) and gets discharged through the third port ($D_3$) of the beam split means, equal to the intensity of ASE, which enters through the second port ($D_2$) and gets discharged through the third port ($D_3$) of the beam split means.

15. A low noise optical amplifier according to claim 13, further comprising a beam attenuation means located on the first or second common path ($L_{c1}$, $L_{c2}$) to attenuate optical signals and ASE so that the intensity of ASE, which enters through the first port ($D_1$) and gets discharged through the third port ($D_3$) of the beam split means, is equal to the intensity of ASE, which enters through the second port ($D_2$) and gets discharged through the third port ($D_3$) of the beam split means.

16. A low noise optical amplifier according to claim 15, wherein the beam separation means and the beam attenuation means are couplers.

17. A low noise optical amplifier according to any of claims 1 to 16, wherein the ASEs have same phase.

18. A low noise optical amplifier according to any of claims 1 to 16, wherein the ASEs have same intensity.

19. A low noise optical amplifier according to claim 17, wherein the ASEs have same intensity.

20. A low noise optical amplifier according to claim 19, wherein the optical amplifying element has a grating structure in which first medium having an effective refractive index ($n_1$) with thickness ($t_1$) and second medium having an effective refractive index ($n_2$) with thickness ($t_2$) alternate regularly along the direction of beam propagation, wherein the grating space between two gratings approximately satisfies the following equation:

$$(n_1 \times t_1) + (n_2 \times t_2) = \frac{m\lambda}{2}$$

where $\lambda$ is a designed wavelength, m is a natural number, and wherein at least one of the first and second mediums has gain.

21. A low noise optical amplifier according to claim 20, wherein m is 1 in the equation.

22. A low noise optical amplifier according to claim 21, wherein all of mediums located in both ends and the center of the optical amplifying element are made of the first medium and the optical amplifying element has a reflection symmetry about the center.

23. A low noise optical amplifier according to claim 22, wherein a phase shift of $\pi/2$ (90°) is applied at the center of the grating of the optical amplifying element.

24. A low noise optical amplifier according to claim 23, wherein the real part of the effective refractive index of the first and second mediums are same or similar, the first medium has gain, and the second medium has loss or zero gain.

25. A low noise optical amplifier according to claim 24, wherein the thickness ($t_1$) of the first medium is given by the following equation: $t_1 \leq \lambda/(4n_1)$.

26. A low noise optical amplifier according to claim 17, wherein the optical path length difference ($\Delta L = L_1 - L_2$) between the first and second paths is given by the following equation: $\Delta L = \lambda/(4n_0)$, where $\lambda$ is a designed wavelength and $n_0$ is an effective refractive index of the optical path $L_1$ and $L_2$.

27. A low noise optical amplifier according to claim 9, wherein the ASEs have same phase and the optical path length difference ($\Delta L_i$) between the first and second paths is given by the following equation: $\Delta L_i = (L_{i1} + L_{c1}) - (L_{i2} + L_{c2}) = \lambda_1/(4n_0)$, where $1 \leq i(\text{integer}) \leq n$, $L_{i1}$ and $L_{i2}$ are the length of division paths, $L_{c1}$ and $L_{c2}$ are the length of common path, $\lambda_i$ is a designed wavelength, $n_0$ is an effective refractive index of the optical path.

28. A low noise optical amplifier according to claim 19, wherein the split ratio of the beam split means is 50:50.

29. An optical communication system having a plurality of optical amplifiers installed between a transmitting station and a receiving station, wherein the optical amplifier comprises:

an optical amplifying element to amplify optical signals with a predetermined wavelength ($\lambda$) entering through one or both of ends ($F_1$, $F_2$), and impose a fixed phase difference on ASE (amplified spontaneous emission) with a predetermined wavelength ($\lambda$), which is generated within the amplifying element and emitted through both ends ($F_1$, $F_2$);

a beam split means to interfere amplified optical signals and ASE from one end ($F_1$) of the optical amplifying element with those from the other end ($F_2$) of the optical amplifying element, the beam split means having four optical ports ($D_1$, $D_2$, $D_3$, $D_4$), in which a beam entering through either the first port ($D_1$) or the second port ($D_2$) splits into the third port ($D_3$) and the fourth port ($D_4$), and a beam entering through either the third port ($D_3$) or the fourth port ($D_4$) splits into the first port ($D_1$) and the second port ($D_2$);

a first path of length ($L_1$) optically connecting one end ($F_1$) of the optical amplifying element to the first port ($D_1$) of the beam split means; and a second path of length ($L_2$) optically connecting the other end ($F_2$) of the optical amplifying element to the second port ($D_2$) of the beam split means, wherein the path length difference between the first and second path ($L_1$ and $L_2$) is designed so that the amplified optical signals have constructive interference at the third port ($D_3$) of the beam split means and destructive interference at the fourth port ($D_4$), whereas the internally generated ASE having the same wavelength as the signal has destructive interference at the third port ($D_3$) of the beam split means and constructive interference at the fourth port ($D_4$), whereby ASEs are separated from the amplified optical signals to prevent the degradation of SNR(signal-to-noise ratio) in the receiving station.

30. An optical communication system according to claim 29, wherein the optical amplifier further comprises a beam separation means to separate optical signals entering through the third port ($D_3$) of the beam split means, to be amplified, from amplified optical signals discharged through the third port ($D_3$).

31. An optical communication system according to claim 30, wherein the beam separation means has at least three ports ($S_1$, $S_2$, $S_3$), in which a portion or all of optical signals entering through one port ($S_1$), which is to be amplified, is discharged through another port ($S_2$), while a portion or all of optical signals entering through another port ($S_2$), which is already amplified, is discharged through the other port ($S_3$).

32. An optical communication system having a plurality of optical amplifiers installed between a transmitting station and a receiving station, in which the optical amplifiers individually amplify a plurality of optical signals having different wavelengths ($\lambda_1 \sim \lambda_n$) based on each wavelength ($\lambda_i$; here, $1 \leq i(\text{integer}) \leq n$), wherein the optical amplifier comprises:

an optical amplifying element array ($A_1 \sim A_n$) having a plurality of optical amplifying elements for each wavelength ($\lambda_i$; here, $1 \leq i(\text{integer}) \leq n$) to amplify an optical signal of a wavelength ($\lambda_i$) entering through one or both of ends ($F_{i1}$, $F_{i2}$) and impose a fixed phase difference on ASE (amplified spontaneous emission) with a wavelength ($\lambda_i$), which is generated within the optical amplifying element;

first multiplexing and demultiplexing means to multiplex amplified optical signals and ASEs, which are discharged through one ends ($F_{11} \sim F_{n1}$) of the amplifying elements and transmitted along division paths ($L_{11} \sim L_{n1}$) for each wavelength, into one common path ($L_{c1}$) and divide a plurality of optical signals with different wavelengths transmitted through the common path ($L_{c1}$) based on each wavelength and then demultiplex the optical signals into the division paths for each wavelength;

second multiplexing and demultiplexing means to multiplex amplified optical signals and ASEs, which are discharged through the other ends ($F_{12} \sim F_{n2}$) of the amplifying elements and transmitted along division paths ($L_{12} \sim L_{n2}$) for each wavelength, into one common path ($L_{c2}$) and divide a plurality of optical signals with different wavelengths transmitted through the common path ($L_{c2}$) based on each wavelength and then demultiplex the optical signals into the division paths for each wavelength, the first and second multiplexing and demultiplexing means having divided ports ($W_{11} \sim W_{n1}$ and $W_{12} \sim W_{n2}$) for each wavelength to lead in and discharge each beam with different wavelength, and common ports ($W_{c1}$, $W_{c2}$) to lead-in and discharge a plurality of beams with various wavelengths;

a beam split means to interfere a plurality of amplified optical signals and ASEs having different wavelengths multiplexed by the first multiplexing and demultiplexing means with a plurality of amplified optical signals and ASEs having different wavelengths multiplexed by the second multiplexing and demultiplexing means, the beam split means having four optical ports ($D_1$, $D_2$, $D_3$, $D_4$), in which a beam entering through either the first port (D$_1$) or the second port (D$_2$) splits into the third port (D$_3$) and the fourth port (D$_4$), whereas a beam entering through either the third port (D$_3$) or the fourth port (D$_4$) splits into the first port (D$_1$) and the second port (D$_2$);

a first path including the first division path (L$_{11}$~L$_{n1}$) for optically connecting one ends (F$_{11}$~F$_{n1}$) of the amplifying elements to each of the divided ports (W$_{11}$~W$_{n1}$) of the first multiplexing and demultiplexing means, and the first common path (L$_{c1}$) for optically connecting the common port (W$_{c1}$) of the first multiplexing and demultiplexing means to the first port (D$_1$) of the beam split means; and a second path including the second division path (L$_{12}$~L$_{n2}$) for optically connecting the other ends (F$_{12}$~F$_{n2}$) of the amplifying elements to each of the divided ports (W$_{12}$~W$_{n2}$) of the second multiplexing and demultiplexing means, and the second common path (L$_{c2}$) for optically connecting the common ports (W$_{c2}$) of the second multiplexing and demultiplexing means to the second port (D$_2$) of the beam split means, wherein the path length difference between the first and second path is designed so that the amplified optical signals have constructive interference at the third port (D$_3$) of the beam split means and destructive interference at the fourth port (D$_4$), whereas the ASEs have destructive interference at the third port (D$_3$) of the beam split means and constructive interference at the fourth port (D$_4$), whereby ASEs are separated from the amplified optical signals to prevent degradation of SNR (signal-to-noise ratio) in the receiving station.

33. An optical communication system according to claim 32, wherein the optical amplifier further comprises a beam separation means to separate optical signals entering through the third port (D$_3$) of the beam split means, to be amplified, from amplified optical signals discharged through the third port (D$_3$).

34. An optical communication system according to claim 33, wherein the beam separation means has at least three ports (S$_1$, S$_2$, S$_3$), in which a portion or all of optical signals entering through one port (S$_1$), which is to be amplified, is discharged through another port (S$_2$), while a portion or all of optical signals entering through another port (S$_2$), which is already amplified, is discharged through the other port (S$_3$).

35. An optical communication system according to any of claims 29 to 34, wherein the ASEs have same phase.

36. An optical communication system according to claim 35, wherein the ASEs have same intensity.

37. An optical communication system according to claim 36, wherein the optical amplifying element has a grating structure in which first medium having an effective refractive index (n$_1$) with thickness (t$_1$) and second medium having an effective refractive index (n$_2$) with thickness (t$_2$) alternate regularly along the direction of beam propagation, wherein the grating period approximately satisfies the following equation:

$$(n_1 \times t_1) + (n_2 \times t_2) = \frac{m\lambda}{2}$$

where $\lambda$ is a designed wavelength, m is a natural number, and wherein at least one of the first and second mediums has gain.

38. An optical communication system according to claim 37, wherein m is 1 in the equation.

39. An optical communication system according to claim 38, wherein all of mediums located in both ends and the center of the optical amplifying element are made of the first medium and the optical amplifying element has a reflection symmetry about the center.

40. An optical communication system according to claim 39, wherein a phase shift of $\pi/2$ (90°) is applied at the center of the grating of the optical amplifying element.

41. An optical communication system according to claim 40, wherein the real part of the effective refractive index of the first and second mediums are same or similar, the first medium has gain, and the second medium has loss or zero gain.

42. An optical communication system according to claim 41, wherein the thickness (t$_1$) of the first medium is given by the following equation: $t_1 \leq \lambda/(4n_1)$.

43. An optical communication system according to claim 29, wherein the optical length path difference ($\Delta L = L_1 - L_2$) between the first and second paths is given by the following equation: $\Delta L = \lambda/(4n_0)$, where $\lambda$ is a designed wavelength and n$_0$ is an effective refractive index of the optical path L$_1$ and L$_2$.

44. An optical communication system according to claim 32, wherein the ASEs have same phase and the optical path length difference ($\Delta L_i$) between the first and second paths is given by the following equation: $\Delta L_i = (L_{i1} + L_{c1}) - (L_{i2} + L_{c2}) = \lambda_i/(4n_0)$, where $1 \leq i(\text{integer}) \leq n$, L$_{i1}$ and L$_{i2}$ are the length of division paths, L$_{c1}$ and L$_{c2}$ are the length of common path, $\lambda_i$ is a designed wavelength, n$_0$ is an effective refractive index of the optical path.

45. An optical communication system according to claim 36, wherein the split ratio of the beam split means is 50:50.

* * * * *